United States Patent
Zheng et al.

(10) Patent No.: US 12,207,274 B2
(45) Date of Patent: Jan. 21, 2025

(54) TRANSMISSION CONFIGURATION INDICATOR STATE ACTIVATION FOR MULTIPLE TRANSMISSION RECEPTION POINTS

(71) Applicant: QUALCOMM Incorporated, San Diego, CA (US)

(72) Inventors: Ruiming Zheng, Beijing (CN); Mostafa Khoshnevisan, San Diego, CA (US); Linhai He, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 17/759,970

(22) PCT Filed: Jan. 13, 2021

(86) PCT No.: PCT/CN2021/071392
§ 371 (c)(1),
(2) Date: Aug. 2, 2022

(87) PCT Pub. No.: WO2021/155737
PCT Pub. Date: Aug. 12, 2021

(65) Prior Publication Data
US 2023/0037549 A1    Feb. 9, 2023

(30) Foreign Application Priority Data
Feb. 7, 2020    (WO) ............... PCT/CN2020/074475

(51) Int. Cl.
*H04W 72/23*    (2023.01)
*H04B 7/024*    (2017.01)
*H04B 7/06*    (2006.01)

(52) U.S. Cl.
CPC ............ *H04W 72/23* (2023.01); *H04B 7/024* (2013.01); *H04B 7/0617* (2013.01); *H04B 7/0695* (2013.01)

(58) Field of Classification Search
None
See application file for complete search history.

(56) References Cited

U.S. PATENT DOCUMENTS

| | | | |
|---|---|---|---|
| 2018/0048375 A1 | 2/2018 | Guo et al. | |
| 2019/0297603 A1* | 9/2019 | Guo | H04L 5/0053 |

(Continued)

FOREIGN PATENT DOCUMENTS

| | | |
|---|---|---|
| CN | 110366251 A | 10/2019 |
| CN | 110391881 A | 10/2019 |
| CN | 110731112 A | 1/2020 |

OTHER PUBLICATIONS

Mediatek Inc: "MAC CE Format for Single PDCCH Multi-TRP", 3GPP Draft, (Revision of R2-1911129) R2-1913239, 3GPP TSG-RAN WG2 Meeting#107Bis, MAC CE Format for Single PDCCH Multi-TRP, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 4, 2019, XP051804924, 6 Pages, Sections 1-2.

(Continued)

*Primary Examiner* — Hong S Cho
(74) *Attorney, Agent, or Firm* — Holland & Hart LLP

(57) ABSTRACT

Methods, systems, and devices for signaling for transmission configuration indication (TCI) state activation for multiple transmission reception points are described. A user equipment (UE) may receive at least one control message indicating a first set of beam configurations associated with a first downlink shared channel from a first transmission reception point (TRP) and a second set of beam configura- (Continued)

tions associated with a second downlink shared channel from a second TRP. The UE may receive downlink control information (DCI) from the first and second TRPs indicating a first beam configuration of the first set of beam configurations and a second beam configuration of the second set of beam configurations, respectively. The UE may subsequently decode a first downlink transmission from the first downlink shared channel according to the first beam configuration and a second downlink transmission from the second downlink shared channel according to the second beam configuration.

20 Claims, 20 Drawing Sheets

(56) References Cited

U.S. PATENT DOCUMENTS

| | | | |
|---|---|---|---|
| 2019/0313429 A1 | 10/2019 | Cheng | |
| 2020/0014454 A1* | 1/2020 | Guo | H04B 7/0408 |

OTHER PUBLICATIONS

Qualcomm Incorporated: "Multi-TRP Enhancements", 3GPP TSG RAN WG1 Meeting #96, 3GPP Draft; R1-1903043 Multi-TRP Enhancements, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, 30 Pages, XP051600739, Section 4.1.
SAMSUNG: "Further Considerations of Support for Multi-PDCCH Based Multi-TRP Operation", 3GPP TSG-RAN WG2 Meeting #107bis, R2-1912515, 3rd Generation Partnership Project, Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 4, 2019, XP051790558, 5 pages.
Supplementary European Search Report—EP21751044—Search Authority—Munich—Feb. 2, 2024 (202312EP).
Mediatek Inc: "MAC CE Format for Single PDCCH Multi-TRP", 3GPP TSG-RAN WG2 Meeting#107Bis, R2-1913239 (Revision of R2-1911129), Chongqing, China, Oct. 14, 2019-Oct. 18, 2019, Oct. 4, 2019, 6 Pages.
AT&T: "Overview of Multi-TRP/Panel Enhancements", R1-1810682, 3GPP TSG RAN WG1 Meeting #94bis, Oct. 8-12, 2018 (Oct. 12, 2018), 24 pages, the whole document.
Huawei, et al., "Enhancements on Multi-TRP/Panel Transmission", 3GPP Draft, 3GPP TSG RAN WG1 Meeting #94bis, R1-1810104, 3rd Generation Partnership Project (3GPP), Mobile Competence Centre; 650, Route Des Lucioles; F-06921, Sophia-Antipolis Cedex; France, vol. RAN WG1, No. Chengdu, China; Oct. 8, 2018-Oct. 12, 2018, Sep. 29, 2018 (Sep. 29, 2018), XP051517519, 18 Pages, Oct. 12, 2018 (Oct. 12, 2018), section 1, Retrieved from the Internet: URL: http://www.3gpp.org/ftp/tsg%5Fran/WG1%5FRL1/TSGR1%5F94b/Docs/R1%2D1810104%2Ezip, the whole document.
International Search Report and Written Opinion—PCT/CN2020/074475—ISA/EPO—Nov. 18, 2020 (202312WO1).
International Search Report and Written Opinion—PCT/CN2021/071392—ISA/EPO—Apr. 27, 2021 (202312WO2).

* cited by examiner

TRANSMISSION CONFIGURATION INDICATOR STATE ACTIVATION FOR MULTIPLE TRANSMISSION RECEPTION POINTS

CROSS REFERENCES

The present Application is a 371 national stage filing of International PCT Application No. PCT/CN2021/071392 by ZHENG et al., entitled "TRANSMISSION CONFIGURATION INDICATOR STATE ACTIVATION FOR MULTIPLE TRANSMISSION RECEPTION POINTS," filed Jan. 13, 2021; and claims priority to International Patent Application No. PCT/CN2020/074475 to ZHENG et al., entitled "TRANSMISSION CONFIGURATION INDICATOR STATE ACTIVATION FOR MULTIPLE TRANSMISSION RECEPTION POINTS," filed Feb. 7, 2020, each of which is assigned to the assignee hereof, and each of which is expressly incorporated by reference in its entirety herein.

FIELD OF TECHNOLOGY

The following relates generally to wireless communications and more specifically to transmission configuration indication (TCI) state activation for multiple transmission reception points.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may be in communication with more than one transmission reception point (TRP) (e.g., in a multi-TRP configuration). Each of the more than one TRP may transmit downlink transmissions to the UE according to a beam configuration and the UE may decode the downlink transmissions from each of the more than one TRPs according to the beam configurations.

SUMMARY

The described techniques relate to improved methods, systems, devices, and apparatuses that support transmission configuration indication (TCI) state activation for multiple transmission reception points. Generally, the described techniques provide for indicating beam configurations for downlink transmissions. More specifically, a user equipment (UE) may be in communication with multiple transmission reception points (TRPs). Each TRP may transmit downlink transmissions (e.g., by a physical downlink shared channel (PDSCH)) according to a beam configuration. At least one of the multiple TRPs may transmit a control message (e.g., a media access control (MAC)-control element (CE)) indicating, for each of the multiple TRPs, a set of activated beam configurations associated with the downlink transmission. Each of the multiple TRPs may transmit downlink control information (DCI) (e.g., via a physical downlink control channel (PDCCH)) to dynamically select one of the set of activated beam configurations for a subsequent downlink transmission from that TRP. Each TRP may transmit the downlink transmission according to a beam configuration indicated by the DCI. For example, a first TRP may transmit a first downlink transmission to the UE according to a beam configuration indicated DCI transmitted by the first TRP. Additionally, a second TRP may transmit a second downlink transmission to the UE according to a beam configuration indicated by DCI transmitted by the second TRP.

A method of wireless communication is described. The method may include receiving at least one control message indicating a first set of beam configurations associated with a first downlink shared channel from a first TRP and a second set of beam configurations associated with a second downlink shared channel from a second TRP, receiving, from the first TRP, a first DCI scheduling a first downlink transmission on the first downlink shared channel, the first DCI indicating a first beam configuration of the first set of beam configurations, receiving, from the second TRP, a second DCI scheduling a second downlink transmission on the second downlink shared channel, the second DCI indicating a second beam configuration of the second set of beam configurations, decoding the first scheduled downlink transmission from the first downlink shared channel according to the first beam configuration, and decoding the second scheduled downlink transmission from the second downlink shared channel according to the second beam configuration.

An apparatus for wireless communication is described. The apparatus may include a processor, memory coupled with the processor, and instructions stored in the memory. The instructions may be executable by the processor to cause the apparatus to receive at least one control message indicating a first set of beam configurations associated with a first downlink shared channel from a first TRP and a second set of beam configurations associated with a second downlink shared channel from a second TRP, receive, from the first TRP, a first DCI scheduling a first downlink transmission on the first downlink shared channel, the first DCI indicating a first beam configuration of the first set of beam configurations, receive, from the second TRP, a second DCI scheduling a second downlink transmission on the second downlink shared channel, the second DCI indicating a second beam configuration of the second set of beam configurations, decode the first scheduled downlink transmission from the first downlink shared channel according to the first beam configuration, and decode the second scheduled downlink transmission from the second downlink shared channel according to the second beam configuration.

Another apparatus for wireless communication is described. The apparatus may include means for receiving at least one control message indicating a first set of beam configurations associated with a first downlink shared channel from a first TRP and a second set of beam configurations associated with a second downlink shared channel from a second TRP, receiving, from the first TRP, a first DCI scheduling a first downlink transmission on the first downlink shared channel, the first DCI indicating a first beam configuration of the first set of beam configurations, receiving, from the second TRP, a second DCI scheduling a second downlink transmission on the second downlink shared channel, the second DCI indicating a second beam configuration of the second set of beam configurations, decoding the first scheduled downlink transmission from the first downlink shared channel according to the first beam configuration, and decoding the second scheduled downlink transmission from the second downlink shared channel according to the second beam configuration.

A non-transitory computer-readable medium storing code for wireless communication is described. The code may include instructions executable by a processor to receive at least one control message indicating a first set of beam configurations associated with a first downlink shared channel from a first TRP and a second set of beam configurations associated with a second downlink shared channel from a second TRP, receive, from the first TRP, a first DCI scheduling a first downlink transmission on the first downlink shared channel, the first DCI indicating a first beam configuration of the first set of beam configurations, receive, from the second TRP, a second DCI scheduling a second downlink transmission on the second downlink shared channel, the second DCI indicating a second beam configuration of the second set of beam configurations, decode the first scheduled downlink transmission from the first downlink shared channel according to the first beam configuration, and decode the second scheduled downlink transmission from the second downlink shared channel according to the second beam configuration.

In some examples of the method, apparatuses, and non-transitory computer-readable medium described herein, receiving the at least one control message further may include operations, features, means, or instructions for receiving a first control message including a first indication of the first set of beam configurations, and receiving a second control message including a second indication of the second set of beam configurations.

Some examples of the method, apparatuses, and non-transitory computer-readable medium described herein may further include operations, features, means, or instructions for identifying the first beam configuration from the first set of beam configurations based on a mapping between one or more bits within the first DCI and the first set of beam configurations indicated by the first control message, and identifying the second beam configuration from the second set of beam configurations based on a mapping between one or more bits within the second DCI and the second set of beam configurations indicated by the second control message.

In some examples of the method, apparatuses, and non-transitory computer-readable medium described herein, receiving the first control message further may include operations, features, means, or instructions for receiving the first control message from the first TRP, and receiving the second control message further may include operations, features, means, or instructions for receiving the second control message from the second TRP.

Some examples of the method, apparatuses, and non-transitory computer-readable medium described herein may further include operations, features, means, or instructions for determining that the first set of beam configurations may be associated with the first downlink shared channel from the first TRP based on receiving the first control message from the first TRP, and determining that the second set of beam configurations may be associated with the second downlink shared channel from the second TRP based on receiving the second control message from the second TRP.

Some examples of the method, apparatuses, and non-transitory computer-readable medium described herein may further include operations, features, means, or instructions for determining that the first set of beam configurations may be associated with the first downlink shared channel from the first TRP based on a first value of an indicator bit within the first control message indicating the first TRP, and determining that the second set of beam configurations may be associated with the second downlink shared channel from the second TRP based on a second value of the indicator bit within the second control message indicating the second TRP.

Some examples of the method, apparatuses, and non-transitory computer-readable medium described herein may further include operations, features, means, or instructions for determining that the first set of beam configurations may be associated with the first downlink shared channel from the first TRP based on a first value of an indicator bit within the first control message indicating the first TRP, and determining that the second set of beam configurations may be associated with the second downlink shared channel from the second TRP based on a second value of the indicator bit within the second control message indicating the second TRP.

Some examples of the method, apparatuses, and non-transitory computer-readable medium described herein may further include operations, features, means, or instructions for receiving a configuration message indicating a set of beam configurations associated with the first downlink shared channel and the second downlink shared channel, where the at least one control message indicates the first set of beam configurations and the second set of beam configurations from the set of beam configurations.

In some examples of the method, apparatuses, and non-transitory computer-readable medium described herein, the at least one control message includes an indicator bit corresponding to each of the set of beam configurations, and the at least one control message indicates the first set of beam configurations and the second set of beam configurations based on a value of each of the indicator bits corresponding to each of the set of beam configurations.

In some examples of the method, apparatuses, and non-transitory computer-readable medium described herein, the configuration message may be a radio resource control message.

In some examples of the method, apparatuses, and non-transitory computer-readable medium described herein, receiving the at least one control message further may include operations, features, means, or instructions for receiving one control message including a first indication of the first set of beam configurations and a second indication of the second set of beam configurations.

In some examples of the method, apparatuses, and non-transitory computer-readable medium described herein, receiving the one control message further may include operations, features, means, or instructions for receiving the one control message from the first TRP.

In some examples of the method, apparatuses, and non-transitory computer-readable medium described herein, receiving the one control message further may include operations, features, means, or instructions for receiving the one control message from the second TRP.

In some examples of the method, apparatuses, and non-transitory computer-readable medium described herein, each of the one control message includes a first set of identifiers identifying each beam configuration within the first set of beam configurations and a second set of identifiers identifying each beam configuration within the second set of beam configurations.

Some examples of the method, apparatuses, and non-transitory computer-readable medium described herein may further include operations, features, means, or instructions for identifying the first beam configuration from the first set of beam configurations based on a mapping between one or more bits within the first DCI and the first set of beam configurations indicated by the one control message, and identifying the second beam configuration from the second set of beam configurations based on a mapping between one or more bits within the second DCI and the second set of beam configurations indicated by the one control message.

Some examples of the method, apparatuses, and non-transitory computer-readable medium described herein may further include operations, features, means, or instructions for determining that the first set of identifiers identify each beam configuration within the first set of beam configurations based on a position of the first set of identifiers within the one control message and receiving the one control message from the first TRP, and determining that the second set of identifiers identify each beam configuration within the second set of beam configurations based on a position of the second set of identifiers within the one control message and receiving the one control message from the first TRP.

Some examples of the method, apparatuses, and non-transitory computer-readable medium described herein may further include operations, features, means, or instructions for determining that the first set of identifiers identify each beam configuration within the first set of beam configurations based on at least one of a position of the first set of identifiers within the one control message or one or more indicator bits within the one control message indicating the first TRP or the second TRP, and determining that the second set of identifiers identify each beam configuration within the second set of beam configurations based on at least one of a position of the second set of identifiers within the one control message or the one or more indicator bits within the one control message indicating the first TRP or the second TRP.

In some examples of the method, apparatuses, and non-transitory computer-readable medium described herein, the one or more indicator bits include one indicator bit.

In some examples of the method, apparatuses, and non-transitory computer-readable medium described herein, the one or more indicator bits include two or more indicator bits, and each indicator bit corresponds to at least one identifier of the first set of identifiers or the second set of identifiers.

In some examples of the method, apparatuses, and non-transitory computer-readable medium described herein, the first set of beam configurations includes a set of TCI states.

In some examples of the method, apparatuses, and non-transitory computer-readable medium described herein, the at least one control message includes a MAC-CE.

A method of wireless communication is described. The method may include transmitting at least one control message indicating a first set of beam configurations associated with a first downlink shared channel from a first TRP and a second set of beam configurations associated with a second downlink shared channel from a second TRP, transmitting, by the first TRP, a first DCI scheduling a first downlink transmission on the first downlink shared channel, the first DCI indicating a first beam configuration of the first set of beam configurations, transmitting, by the second TRP, a second DCI scheduling a second downlink transmission on the second downlink shared channel, the second DCI indicating a second beam configuration of the second set of beam configurations, transmitting the first scheduled downlink transmission by the first downlink shared channel according to the first beam configuration, and transmitting the second scheduled downlink transmission by the second downlink shared channel according to the second beam configuration.

An apparatus for wireless communication is described. The apparatus may include a processor, memory coupled with the processor, and instructions stored in the memory. The instructions may be executable by the processor to cause the apparatus to transmit at least one control message indicating a first set of beam configurations associated with a first downlink shared channel from a first TRP and a second set of beam configurations associated with a second downlink shared channel from a second TRP, transmit, by the first TRP, a first DCI scheduling a first downlink transmission on the first downlink shared channel, the first DCI indicating a first beam configuration of the first set of beam configurations, transmit, by the second TRP, a second DCI scheduling a second downlink transmission on the second downlink shared channel, the second DCI indicating a second beam configuration of the second set of beam configurations, transmit the first scheduled downlink transmission by the first downlink shared channel according to the first beam configuration, and transmit the second scheduled downlink transmission by the second downlink shared channel according to the second beam configuration.

Another apparatus for wireless communication is described. The apparatus may include means for transmitting at least one control message indicating a first set of beam configurations associated with a first downlink shared channel from a first TRP and a second set of beam configurations associated with a second downlink shared channel from a second TRP, transmitting, by the first TRP, a first DCI scheduling a first downlink transmission on the first downlink shared channel, the first DCI indicating a first beam configuration of the first set of beam configurations, transmitting, by the second TRP, a second DCI scheduling a second downlink transmission on the second downlink shared channel, the second DCI indicating a second beam configuration of the second set of beam configurations, transmitting the first scheduled downlink transmission by the first downlink shared channel according to the first beam configuration, and transmitting the second scheduled downlink transmission by the second downlink shared channel according to the second beam configuration.

A non-transitory computer-readable medium storing code for wireless communication is described. The code may include instructions executable by a processor to transmit at least one control message indicating a first set of beam configurations associated with a first downlink shared channel from a first TRP and a second set of beam configurations associated with a second downlink shared channel from a second TRP, transmit, by the first TRP, a first DCI scheduling a first downlink transmission on the first downlink shared channel, the first DCI indicating a first beam configuration of the first set of beam configurations, transmit, by the second TRP, a second DCI scheduling a second downlink transmission on the second downlink shared channel, the second DCI indicating a second beam configuration of the second set of beam configurations, transmit the first scheduled downlink transmission by the first downlink shared channel according to the first beam configuration, and transmit the second scheduled downlink transmission by the second downlink shared channel according to the second beam configuration.

In some examples of the method, apparatuses, and non-transitory computer-readable medium described herein, transmitting the at least one control message further may include operations, features, means, or instructions for transmitting a first control message including a first indication of the first set of beam configurations, and transmitting a second control message including a second indication of the second set of beam configurations.

Some examples of the method, apparatuses, and non-transitory computer-readable medium described herein may further include operations, features, means, or instructions for indicating the first beam configuration from the first set of beam configurations based on a mapping between one or more bits within the first DCI and the first set of beam configurations indicated by the first control message, and indicating the second beam configuration from the second set of beam configurations based on a mapping between one or more bits within the second DCI and the second set of beam configurations indicated by the second control message.

In some examples of the method, apparatuses, and non-transitory computer-readable medium described herein, transmitting the first control message further may include operations, features, means, or instructions for transmitting the first control message by the first TRP, and transmitting the second control message further may include operations, features, means, or instructions for transmitting the second control message by the second TRP.

Some examples of the method, apparatuses, and non-transitory computer-readable medium described herein may further include operations, features, means, or instructions for indicating that the first set of beam configurations may be associated with the first downlink shared channel from the first TRP based on transmitting the first control message by the first TRP, and indicating that the second set of beam configurations may be associated with the second downlink shared channel from the second TRP based on transmitting the second control message by the second TRP.

Some examples of the method, apparatuses, and non-transitory computer-readable medium described herein may further include operations, features, means, or instructions for indicating that the first set of beam configurations may be associated with the first downlink shared channel from the first TRP based on a first value of an indicator bit within the first control message indicating the first TRP, and indicating that the second set of beam configurations may be associated with the second downlink shared channel from the second TRP based on a second value of the indicator bit within the second control message indicating the second TRP.

Some examples of the method, apparatuses, and non-transitory computer-readable medium described herein may further include operations, features, means, or instructions for transmitting a configuration message indicating a set of beam configurations associated with the first downlink shared channel and the second downlink shared channel, where the at least one control message indicates the first set of beam configurations and the second set of beam configurations from the set of beam configurations.

In some examples of the method, apparatuses, and non-transitory computer-readable medium described herein, the at least one control message includes an indicator bit corresponding to each of the set of beam configurations, and the at least one control message indicates the first set of beam configurations and the second set of beam configurations based on a value of each of the indicator bits corresponding to each of the set of beam configurations.

In some examples of the method, apparatuses, and non-transitory computer-readable medium described herein, the configuration message may be a radio resource control message.

In some examples of the method, apparatuses, and non-transitory computer-readable medium described herein, transmitting the at least one control message further may include operations, features, means, or instructions for transmitting one control message including a first indication of the first set of beam configurations and a second indication of the second set of beam configurations.

In some examples of the method, apparatuses, and non-transitory computer-readable medium described herein, transmitting the one control message further may include operations, features, means, or instructions for transmitting the one control message by the first TRP.

In some examples of the method, apparatuses, and non-transitory computer-readable medium described herein, transmitting the one control message further may include operations, features, means, or instructions for transmitting the one control message by the second TRP.

In some examples of the method, apparatuses, and non-transitory computer-readable medium described herein, each of the one control message includes a first set of identifiers identifying each beam configuration within the first set of beam configurations and a second set of identifiers identifying each beam configuration within the second set of beam configurations.

Some examples of the method, apparatuses, and non-transitory computer-readable medium described herein may further include operations, features, means, or instructions for indicating the first beam configuration from the first set of beam configurations based on a mapping between one or more bits within the first DCI and the first set of beam configurations indicated by the one control message, and indicating the second beam configuration from the second set of beam configurations based on a mapping between one or more bits within the second DCI and the second set of beam configurations indicated by the one control message.

Some examples of the method, apparatuses, and non-transitory computer-readable medium described herein may further include operations, features, means, or instructions for indicating that the first set of identifiers identify each beam configuration within the first set of beam configurations based on a position of the first set of identifiers within the one control message and transmitting the one control message by the first TRP, and indicating that the second set of identifiers identify each beam configuration within the second set of beam configurations based on a position of the second set of identifiers within the one control message and transmitting the one control message by the first TRP.

Some examples of the method, apparatuses, and non-transitory computer-readable medium described herein may further include operations, features, means, or instructions for indicating that the first set of identifiers identify each beam configuration within the first set of beam configurations based on at least one of a position of the first set of identifiers within the one control message or one or more indicator bits within the one control message indicating the first TRP or the second TRP, and indicating that the second set of identifiers identify each beam configuration within the second set of beam configurations based on at least one of a position of the second set of identifiers within the one control message or the one or more indicator bits within the one control message indicating the first TRP or the second TRP.

In some examples of the method, apparatuses, and non-transitory computer-readable medium described herein, the one or more indicator bits include one indicator bit.

In some examples of the method, apparatuses, and non-transitory computer-readable medium described herein, the one or more indicator bits include more than one indicator bit, and each indicator bit corresponds to at least one identifier of the first set of identifiers or the second set of identifiers.

In some examples of the method, apparatuses, and non-transitory computer-readable medium described herein, the first set of beam configurations includes a set of TCI states.

In some examples of the method, apparatuses, and non-transitory computer-readable medium described herein, the at least one control message includes a MAC-CE.

DETAILED DESCRIPTION

Figure 1:
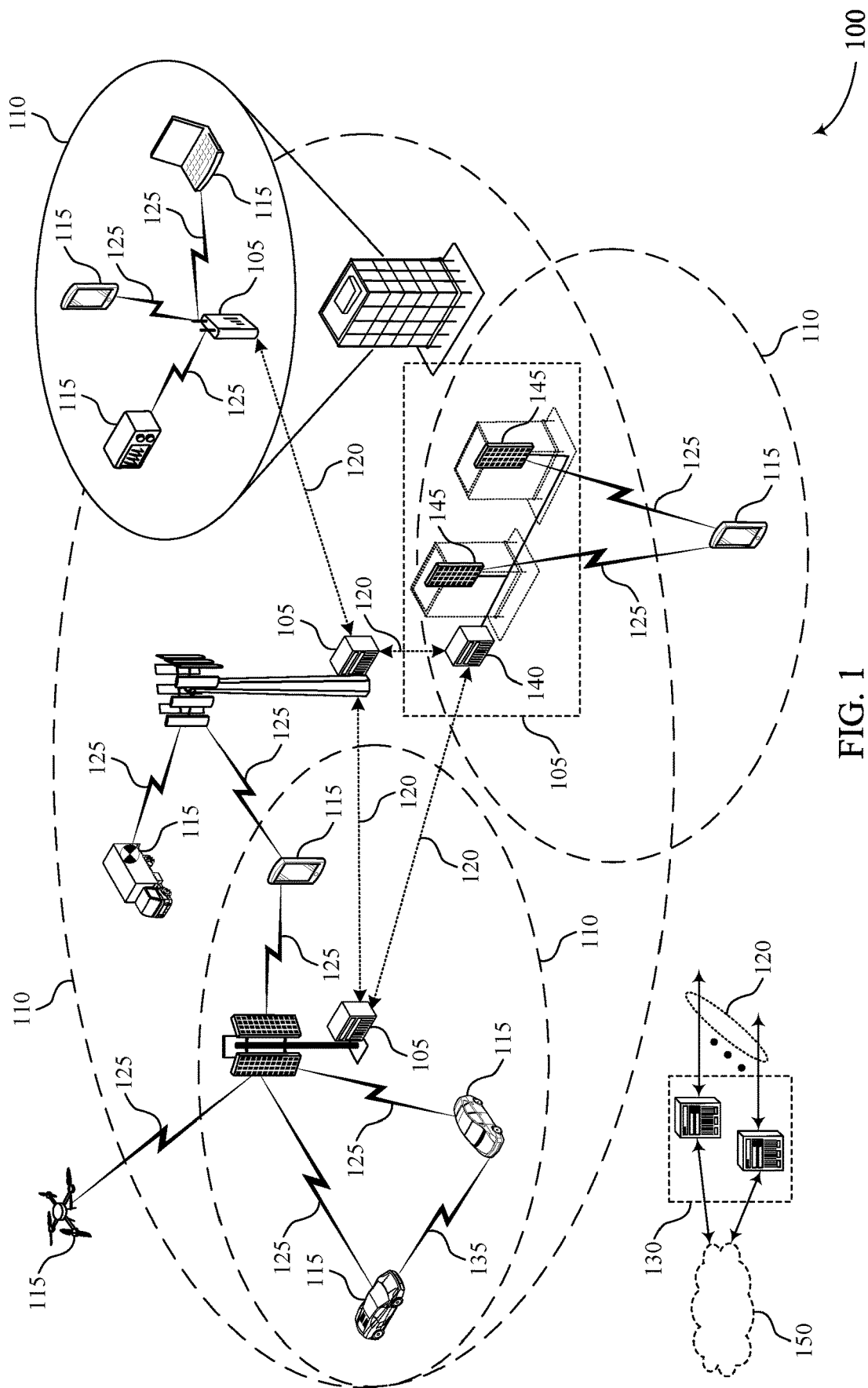
FIG. 1 illustrates an example of a system for wireless communications that supports transmission configuration indication (TCI) state activation for multiple transmission reception points in accordance with aspects of the present disclosure.

In some wireless communications systems, a user equipment (UE) may support communications with multiple transmission reception points (TRPs). For example, the UE may receive downlink transmissions (e.g., via a physical downlink shared channel (PDSCH)) from multiple TRPs. Thus, the UE may utilize one or more multiplexing schemes (e.g., spatial multiplexing) to receive and decode each of the downlink transmissions from the multiple TRPs. Additionally, the UE may decode each of the downlink transmissions according to a beam configuration associated with the downlink transmission. In some wireless communications systems, a single TRP may transmit downlink control information (DCI) selecting multiple beam configurations each associated with a downlink transmission from one of the multiple TRPs. For example, a first TRP may transmit DCI indicating a first beam configuration for a subsequent downlink transmission by the first TRP. In this example, the second TRP may not transmit DCI to the UE. That is, although the UE is in communication with multiple TRPs, the UE may only receive DCI from the first TRP.

In some other wireless communication systems, the UE may receive DCI from each of the multiple TRPs. In such systems, the UE may decode downlink transmissions according to a beam configuration indicated by the DCI transmitted by the same TRP. For example, the UE may decode a downlink transmission from a first TRP according to a beam configuration indicated by the first TRP within DCI. Additionally, the UE may decode a downlink transmission from a second TRP according to a beam configuration indicated by the second TRP within DCI.

The DCI (e.g., transmitted by each of the multiple TRPs) may indicate a beam configuration from a set of beam configurations activated by at least one media access control (MAC)-control element (CE). In a first example, one or more of the multiple TRPs may transmit a MAC-CE activating a set of beam configurations for downlink transmissions from a single TRP. That is, the UE may receive multiple MAC-CEs (e.g., one for each of the multiple TRPs) each activating a set of beam configurations for downlink transmissions from a single TRP. Here, the UE may receive a MAC-CE from each of the TRPs, where each TRP transmits a MAC-CE activating beam configurations for downlink transmissions from that TRP. Additionally or alternatively, a single TRP may transmit the multiple MAC-CEs activating beam configurations for that TRP and one or more additional TRPs. In another example, a TRP may transmit a single MAC-CE activating sets of beam configurations for each of the multiple TRPs. That is, the single MAC-CE may activate a first set of beam configurations for a first TRP and a second set of beam configurations for a second TRP.

Aspects of the disclosure are initially described in the context of wireless communications systems. Aspects of the disclosure are than described in the context of MAC-CE configurations and a process flow. Aspects of the disclosure are further illustrated by and described with reference to apparatus diagrams, system diagrams, and flowcharts that relate to transmission configuration indication (TCI) state activation for multiple transmission reception points.

FIG. 1 illustrates an example of a wireless communications system 100 that supports TCI state activation for multiple transmission reception points in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some wireless communications systems 100, a UE 115 may support communications with multiple TRPs (e.g., associated with a single base station 105, associated with more than one base station 105). For example, the UE 115 may receive downlink transmissions by a PDSCH from multiple TRPs. Thus, the UE 115 may utilize one or more multiplexing schemes to receive and decode each of the downlink transmissions from the multiple TRPs. Additionally, the UE 115 may decode each of the downlink transmissions may according to a beam configuration associated with the downlink transmission. In some wireless communications systems 100, a single TRP may transmit DCI selecting multiple beam configurations each associated with a downlink transmission from one of the multiple TRPs. For example, a first TRP may transmit DCI indicating a first beam configuration for a subsequent downlink transmission by the first TRP. In this example, the second TRP may not transmit DCI to the UE 115. That is, although the UE 115 is in communication with multiple TRPs, the UE 115 may only receive DCI from the first TRP.

In some other wireless communications systems 100, the UE 115 may receive DCI from each of the multiple TRPs. Here, the UE 115 may decode downlink transmissions according to a beam configuration indicated by the DCI transmitted by the same TRP. For example, the UE 115 may decode a downlink transmission from a first TRP according to a beam configuration indicated by the first TRP within DCI. Additionally, the UE 115 may decode a downlink transmission from a second TRP according to a beam configuration indicated by the second TRP within DCI.

The DCI (e.g., transmitted by each of the multiple TRPs) may indicate a beam configuration from a set of beam configurations activated by at least one MAC-CE. In a first example, one or more of the multiple TRPs may transmit a MAC-CE activating a set of beam configurations for downlink transmissions from a single TRP. That is, the UE 115 may receive multiple MAC-CEs (e.g., one for each of the multiple TRPs) each activating a set of beam configurations for downlink transmissions from a single TRP. Here, the UE 115 may receive a MAC-CE from each of the TRPs, where each TRP transmits a MAC-CE activating beam configurations for downlink transmissions from that TRP. Additionally or alternatively, a single TRP may transmit the multiple MAC-CEs activating beam configurations for that TRP and one or more additional TRPs. In another example, a TRP may transmit a single MAC-CE activating sets of beam configurations for each of the multiple TRPs. That is, the single MAC-CE may activate a first set of beam configurations for a first TRP and a second set of beam configurations for a second TRP.

As used herein, TCI or TCI state is an example of a beam configuration or a particular beam configuration state, respectively, and the techniques described herein for a TCI or TCI state may also be applied more generally to beam configuration or beam configuration states other than a TCI or TCI state. For example, a TCI state activation or deactivation for a set of TCI states may be applied more generally to a beam configuration activation or deactivation for a set of beam configuration states, and so on. Likewise, the techniques described herein for a beam configuration or beam configuration states may also be applied in the more specific example of a TCI or TCI state.

Similarly, a MAC-CE is an example of control message that may be used to convey a set of a beam configurations (e.g., a set of TCI states), and the techniques described herein for a MAC-CE, such as a particular MAC-CE format or configuration, may also be applied more generally to other control messages so formatted or configured. Likewise, the techniques described herein for a control message may also be applied more specifically to a MAC-CE.

Figure 2:
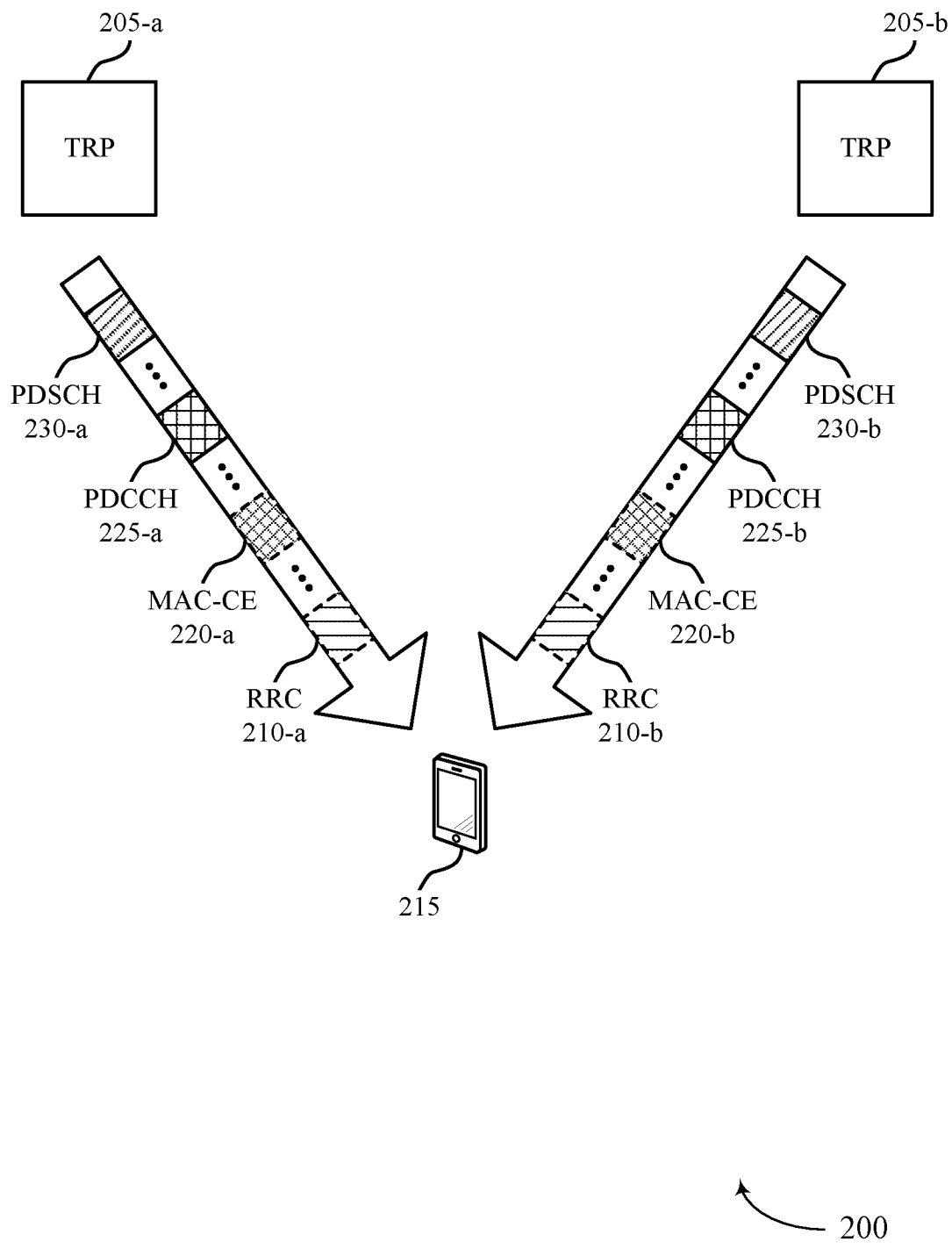
FIG. 2 illustrates an example of a system for wireless communications that supports TCI state activation for multiple transmission reception points in accordance with aspects of the present disclosure.

FIG. 2 illustrates an example of a wireless communications system 200 that supports TCI state activation for multiple transmission reception points in accordance with aspects of the present disclosure. In some examples, wireless communications system 200 may implement aspects of wireless communications system 100 such as UE 215 which may be an example of a UE 115 as described with reference to FIG. 1. Additionally, TRPs 205 may be examples of access network transmission entities 145 as described with reference to FIG. 1. In wireless communications system 200, the UE 215 may be configured to communicate with multiple TRPs 205 (e.g., TRP 205-*a* and TRP 205-*b*).

The UE 215 may receive at least one RRC message 210 from at least one of the TRPs 205. For example, TRP 205-*a* may transmit RRC message 210-*a* to UE 215. Here, TRP 205-*b* may transmit RRC message 210-*b* or may refrain from transmitting RRC message 210-*b*. In another example, TRP 205-*b* may transmit RRC message 210-*b* to UE 215. Here, TRP 205-*a* may transmit RRC message 210-*a* or may refrain from transmitting RRC message 210-*a*. In either example, the UE 215 may receive an RRC message 210 from TRP 205-*a*, TRP 205-*b*, or both TRPs 205. The RRC message 210 may configure a set of beam configurations (e.g., a set of TCI states) for PDSCH transmissions 230 from either of the TRPs 205 to the UE 215. For example, the RRC message 210 may configure up to 128 TCI states for PDSCH transmissions 230 (e.g., downlink transmissions from the PDSCH). Each of the different beam configurations (e.g., indicated by different TCI states) may correspond to quasi colocation (QCL) relationships, for example between different reference signal transmissions (e.g., between downlink reference signal in a CSI-RS set and PDSCH DMRS ports). That is, UE 215 may measure a reference signal (e.g., within a PDSCH transmission 230) using receive beamforming parameters based on a TCI state indicated for the reference signal transmission.

The RRC message 210 may optionally include an indication of a mapping scheme for the PDSCH transmissions 230. That is, if the UE 215 receives more than one PDSCH transmission 230 (e.g., the PDSCH transmission 230-*a* from TRP 205-*a* and the PDSCH transmission 230-*b* from TRP 205-*b*), the resources for each PDSCH transmission 230 may be mapped according to a mapping scheme. For example, the resources for each PDSCH transmission 230 may be mapped according to a frequency division multiplexing (FDM) scheme, a time division multiplexing (TDM) scheme, or a spatial division multiplexing (SDM) scheme, or a combination of these multiplexing schemes, such as FDM plus TDM, FDM plus SDM, or TDM plus SDM. If the RRC message 210 includes the indication of the mapping scheme, the RRC message 210 may additionally include parameters for the mapping scheme.

The UE 215 may receive at least one MAC-CE 220 from at least one of the TRPs 205. That is, the UE 215 may receive at least one of the MAC-CEs 220 and one of the MAC-CE 220 transmissions may be optional. For example, the UE 215 may receive MAC-CE 220-*a* and/or MAC-CE 220-*b*.

The MAC-CEs 220 may be control messages configured to indicate a set of beam configurations from the larger set of beam configurations configured by the RRC messages 210. For example, while the RRC messages 210 may configure up to 128 TCI states for the PDSCH transmissions 230, the at least one MAC-CE 220 may activate up to 8 TCI states for the PDSCH transmissions 230. Here, the at least one of the MAC-CEs 220 may indicate a first set of beam configurations for receiving the PDSCH transmission 230-*a* and a second set of beam configurations for receiving the PDSCH transmission 230-*b*.

The UE 215 may receive a MAC-CE 220 associated with each of the PDSCH transmissions 230. That is, the UE 215 may receive a first MAC-CE 220 indicating a set of beam configurations for PDSCH transmission 230-*a* and the UE 215 may receive a second MAC-CE 220 indicating a set of beam configurations for PDSCH transmission 230-*b*. In some cases, each TRP 205 may transmit the MAC-CE 220 indicating a set of beam configurations for the PDSCH transmission 230 transmitted by that TRP 205. For example, the TRP 205-*a* may transmit the MAC-CE 220-*a* indicating the set of beam configurations for the PDSCH transmission 230-*a* and the TRP 205-*b* may transmit the MAC-CE 220-*b* indicating the set of beam configurations for the PDSCH transmission 230-*b*. Here, the UE 215 may determine to which PDSCH transmission 230 to apply a set of beam configurations based on which TRP 205 transmits the MAC-CE 220-*a*. That is, the UE 215 may determine to apply the set of beam configurations indicated by the MAC-CE 220-*a* to the PDSCH transmission 230-*a* based on receiving the MAC-CE 220-*a* from the TRP 205-*a*. In some other cases, a TRP 205 may transmit a MAC-CE 220 indicating a set of beam configurations for a PDSCH transmission 230 transmitted by that TRP 205 or a different TRP 205. That is, the TRP 205-*a* may transmit the MAC-CE 220-*a* indicating a set of beam configurations for the PDSCH transmission 230-*a* or indicating a set of beam configurations for the PDSCH transmission 230-*b*. Here, the UE 215 may determine to which PDSCH transmission 230 to apply a set of beam configurations based on a value stored by an indicator bit within the MAC-CE 220. For example, the UE 215 may determine to apply a set of beam configurations indicated by the MAC-CE 220-*b* to the PDSCH transmission 230-*a* based on a value stored by the indicator bit of the MAC-CE 220-*b* indicating the TRP 205-*a*.

The UE 215 may receive a single MAC-CE 220 from either TRP 205-*a* or TRP 205-*b*. Here, the MAC-CE 220 may indicate a first set of beam configurations corresponding to the PDSCH transmission 230-*a* and a second set of beam configurations corresponding to the PDSCH transmission 230-*b*. The MAC-CE 220 may include one or more indicator bits, where the value of the indicator bits indicates whether each indicated beam configuration is associated with the first set of beam configurations (e.g., corresponding to the PDSCH transmission 230-*a*) or the second set of beam configurations (e.g., corresponding to the PDSCH transmission 230-*b*). Here, the UE 215 may determine to which PDSCH transmission 230 to apply the set of beam configurations based on values stored by the one or more indicator bits, an order of the indicated beam configurations, or a combination of both. Thus, the at least one MAC-CEs 220 may indicate, to the UE 215, a first set of beam configurations associated with the PDSCH transmission 230-*a* and a second set of beam configurations associated with the PDSCH transmission 230-*b*.

The UE 215 may receive the PDCCH transmission 225-*a* from the TRP 205-*a* and the PDCCH transmission 225-*b* from the TRP 205-*b*. The PDCCH transmissions 225 may include DCI indicating one beam configuration for decoding the PDSCH transmission 230-*a* and one beam configuration for decoding the PDSCH transmission 230-*b*. That is, the PDCCH transmission 225-*a* may indicate one beam configuration from the first set of beam configurations (e.g., indicated by the at least one MAC-CE 220) for decoding the PDSCH transmission 230-*a*. Additionally, the PDCCH transmission 225-*b* may indicate one beam configuration from the second set of beam configurations for decoding the PDSCH transmission 230-*b*. The DCI within the PDCCH transmissions 225 may include an index associated with the one beam configuration. Here, the UE 215 may determine the one beam configuration from the set of beam configurations based on the index indicated within the DCI. For example, if the second set of beam configurations (e.g., associated with the PDSCH transmission 230-*b*) includes eight possible beam configurations, the PDCCH transmission 225-*b* may include a three-bit index. In some examples, the three-bit index may be referred to as a TCI codepoint. The index may also use more or fewer numbers of bits in the index, such as 2, 4, 5 or 6 bits. Here, if the three bit index indicates a logic value '000,' the UE 215 may determine to decode the PDSCH transmission 230-*b* using the first beam configuration of the second set of beam configurations. Additionally, if the three bit index indicates a logic value '011,' the UE 215 may determine to decode the PDSCH transmission 230-*b* using the third beam configuration of the second set of beam configurations.

The TRP 205-*a* may transmit the PDSCH transmission 230-*a* according to the one beam configuration (e.g., of the first set of beam configurations) indicated by the DCI included within the PDCCH transmission 225-*a*. Additionally, the TRP 205-*b* may transmit the PDSCH transmission 230-*b* according to the one beam configuration (e.g., of the second set of beam configurations) indicated by the DCI included within the PDCCH transmission 225-*b*. The UE 215 may decode the PDSCH transmissions 230-*a* and 230-*b* according to the one beam configuration indicated by the PDCCH transmissions 225-*a* and 225-*b*, respectively.

Figure 3A:
FIGS. 3A through 5B illustrate examples of configurations of a media access control (MAC)-control element (CE) that supports TCI state activation for multiple transmission reception points in accordance with aspects of the present disclosure.
Figure 3B:

FIGS. 3A and 3B illustrate example configurations 300 of MAC-CEs 320 that support TCI activation for multiple transmission reception points in accordance with aspects of the present disclosure. In some examples, configurations 300 may implement aspects of wireless communications system 100 and 200 such as MAC-CEs 320, which may be examples of the MAC-CEs 220 as described with reference to FIG. 2. Additionally, the MAC-CEs 320 may be transmitted from a TRP to a UE as described with reference to FIGS. 1 and 2. That is, the UE may be configured to communicate with multiple TRPs, and at least one TRP may transmit a MAC-CE 320 to the UE. Each of the MAC-CEs 320 may be configured to indicate a set of beam configurations for a PDSCH transmission from a TRP.

FIG. 3A illustrates a configuration 300-*a* of the MAC-CE 320-*a*. The MAC-CE 320-*a* may be transmitted from a TRP to a UE as described with reference to FIG. 2. The MAC-CE 320-*a* may include a reserved bit, R 305, a serving cell ID field 310-*a*, a BWP ID field 315-*a*, and a set of T-bit fields 325. The serving cell ID field 310-*a* may include five bits of data and may identify a serving cell for which the MAC-CE 320 is to be applied. The BWP ID field 315-*a* may include two bits and may indicate a downlink BWP for which the MAC-CE 320-*a* applies.

Each of the T-bit fields 325 may correspond to one of the beam configurations indicated by an RRC message. For example, the RRC message may configure up to 128 TCI states and each of the T-bit fields 325 may correspond to one of the up to 128 TCI states. Here, the MAC-CE 320-*a* may include up to 128 T-bit fields 325. Each T-bit field 325 may store a logic value '0' or a logic value '1.' In some cases, each T-bit field 325 storing a logic value '0' may indicate (e.g., to the UE) that the corresponding beam configuration is not in the set of beam configurations. For example, if the T-bit field 325-*v* stores a logic value '0', the UE may determine that the TCI state corresponding to the T-bit field 325-*v* is deactivated. Additionally or alternatively, each T-bit field 325 storing a logic value '1' may indicate that the corresponding beam configuration is in the set of beam configurations. For example, if the T-bit field 325-1 stores a logic value '1', the UE may determine that the TCI state corresponding to the T-bit field 325-1 is activated. In some cases, up to eight of the T-bit fields 325 may store a logic value '1'. That is, the MAC-CE 320-*a* may indicate up to eight beam configurations for a downlink transmission.

A UE may receive the MAC-CE 320-*a* from the TRP and determine, based on the MAC-CE 320-*a*, the set of beam configurations for the downlink transmission. For example, the UE may identify the set of beam configurations by determining which T-bit fields 325 store a logic value '1', and determining that the corresponding beam configurations are included in the set of beam configurations. The UE may identify to which downlink transmission the MAC-CE 320-*a* applies based on the TRP that transmits the MAC-CE 320-*a*. That is, the UE may identify that the MAC-CE 320-*a* applies to a downlink transmission transmitted by the same TRP that transmits the MAC-CE 320-*a*. In some cases, a physical layer of the UE may communicate to a MAC layer of the UE which TRP transmits the MAC-CE 320-*a*, thus enabling the UE to determine to which downlink transmission to apply the MAC-CE 320-*a*. After receiving the MAC-CE 320-*a*, the UE may receive, from the same TRP, DCI indicating one of beam configurations from the set of beam configurations. The DCI may include a set of bits (e.g., a TCI codepoint) for indicating one beam configuration from the set of beam configurations. In the example that the MAC-CE 320-*a* indicates a set of beam configurations including up to eight beam configurations, the set of bits in the DCI may include three bits. Here, the set of bits may indicate a beam configuration based on the order of the T-bit fields 325 indicating the set of beam configurations. An example order of the T-bit fields 325 may indicate that the T-bit field 325-*a* is the first T-bit field, the T-bit field 325-*b* is the second T-bit field, and the T-bit field 325-*x* is the last T-bit field. In the example of this order of the T-bit fields 325, if the set of bits indicate a logic value '000' (e.g., corresponding to a value of zero), the UE may use the beam configuration corresponding to the first T-bit field 325 indicating a logic value '1' to decode the downlink transmission. Additionally or alternatively, if the set of bits indicate a logic value '011' (e.g., corresponding to a value of three), the UE may use the beam configuration corresponding to the fourth T-bit field 325 indicating a logic value '1' to decode the downlink transmission.

FIG. 3B illustrates a configuration 300-*b* of the MAC-CE 320-*b*. The MAC-CE 320-*b* may be transmitted from a TRP to a UE as described with reference to FIG. 2. The MAC-CE 320-*b* may include a P-bit field 330, a serving cell ID field 310-*b*, a BWP ID field 315-*b*, and a set of T-bit fields 335. The serving cell ID field 310-*b* may include five bits of data and may identify a serving cell for which the MAC-CE 320 is to be applied. The BWP ID field 315-*b* may include two bits and may indicate a downlink BWP for which the MAC-CE 320-*b* applies. The P-bit field 330 may indicate a TRP corresponding to the MAC-CE 320-*b*. For example, a logic value '0' within the P-bit field 330 may indicate a first TRP while a logic value '1' may indicate a second TRP. In some cases, the P-bit field 330 may represent an index of the TRP or a group index of a control resource set (CORESET) associated with a TRP.

Each of the T-bit fields 335 may correspond to one of the beam configurations indicated by an RRC message. For example, the RRC message may configure up to 128 TCI states and each of the T-bit fields 335 may correspond to one of the up to 128 TCI states. Here, the MAC-CE 320-*b* may include up to 128 T-bit fields 335. Each T-bit field 335 may store a logic value '0' or a logic value '1.' In some cases, each T-bit field 335 storing a logic value '0' may indicate (e.g., to the UE) that the corresponding beam configuration is not in the set of beam configurations. For example, if the T-bit field 335-*v* stores a logic value '0', the UE may determine that the TCI state corresponding to the T-bit field 335-*v* is deactivated. Additionally or alternatively, each T-bit field 335 storing a logic value '1' may indicate that the corresponding beam configuration is in the set of beam configurations. For example, if the T-bit field 335-1 stores a logic value '1', the UE may determine that the TCI state corresponding to the T-bit field 335-1 is activated. In some cases, up to eight of the T-bit fields 335 may store a logic value '1'. That is, the MAC-CE 320-*b* may indicate up to eight beam configurations for a downlink transmission.

A UE may receive the MAC-CE 320-*b* from the TRP and determine, based on the MAC-CE 320-*b*, the set of beam configurations for the downlink transmission. For example, the UE may identify the set of beam configurations by determining which T-bit fields 335 store a logic value '1', and determining that the corresponding beam configurations are included in the set of beam configurations. The UE may identify to which downlink transmission the MAC-CE 320-*b* applies based on the value of the P-bit field 330 (e.g., an indicator bit field). For example, a logic value '0' in the P-bit field 330 may indicate a first TRP and a logic value '1' in the P-bit field 330 may indicate a second TRP. The UE may then apply MAC-CE 320-*b* to a downlink transmission (e.g., on a PDSCH) transmitted by the indicated TRP that corresponds to the logic value of the P-bit field 330. For example, where the UE detects a logic value '0' in the P-bit field 330 indicating a first TRP, the UE may determine to apply that MAC-CE 320-*b* to receive data transmissions (e.g., on a PDSCH) from the first TRP. Similarly, for another MAC-CE 320-*b* where the UE detects a logic value '1' in the P-bit field 330 indicating a second TRP, the UE may apply that another MAC-CE 320-*b* to receive data transmissions (e.g., on a PDSCH) from the second TRP. After receiving the MAC-CE 320-*b*, the UE may receive, from the TRP indicated by the P-bit field 330, DCI indicating one of the beam configurations from the set of beam configurations indicated by MAC-CE 320-*b*. As described with reference to FIG. 3A, the DCI may include a set of bits (e.g., a TCI codepoint) for indicating one beam configuration from the set of beam configurations. For example, where the DCI is received from the first TRP, the UE determines the beam configuration using the DCI (e.g., the TCI codepoint of the DCI) received from the first TRP and the MAC-CE 320-*b* where the UE detected a logic value '0' in the P-bit field 330. Similarly, where the DCI is received from the second TRP, the UE determines the beam configuration using the DCI (e.g., the TCI codepoint of the DCI) received from the second TRP and the MAC-CE 320-*b* where the UE detected a logic value '1' in the P-bit field 330. In the example that the MAC-CE 320-*b* indicates a set of beam configurations including up to eight beam configurations, the set of bits in the DCI may include three bits. Here, the set of bits may indicate a beam configuration based on the order of the T-bit fields 335 indicating the set of beam configurations. The UE may use the indicated beam configuration to decode a downlink transmission from the TRP indicated by the P-bit field 330.

Figure 4A:
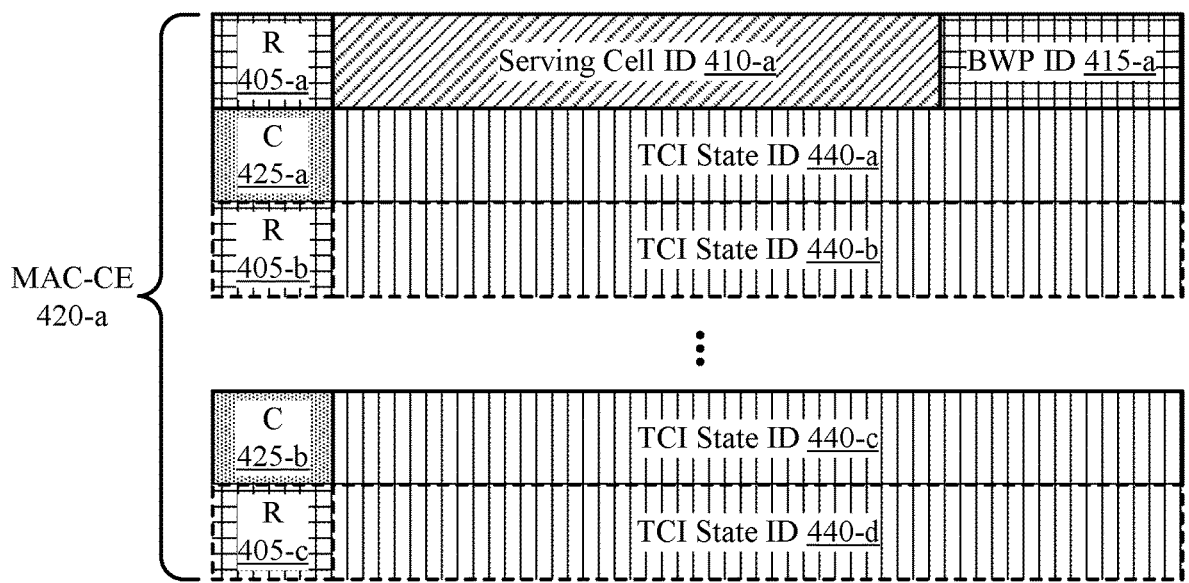
Figure 4B:
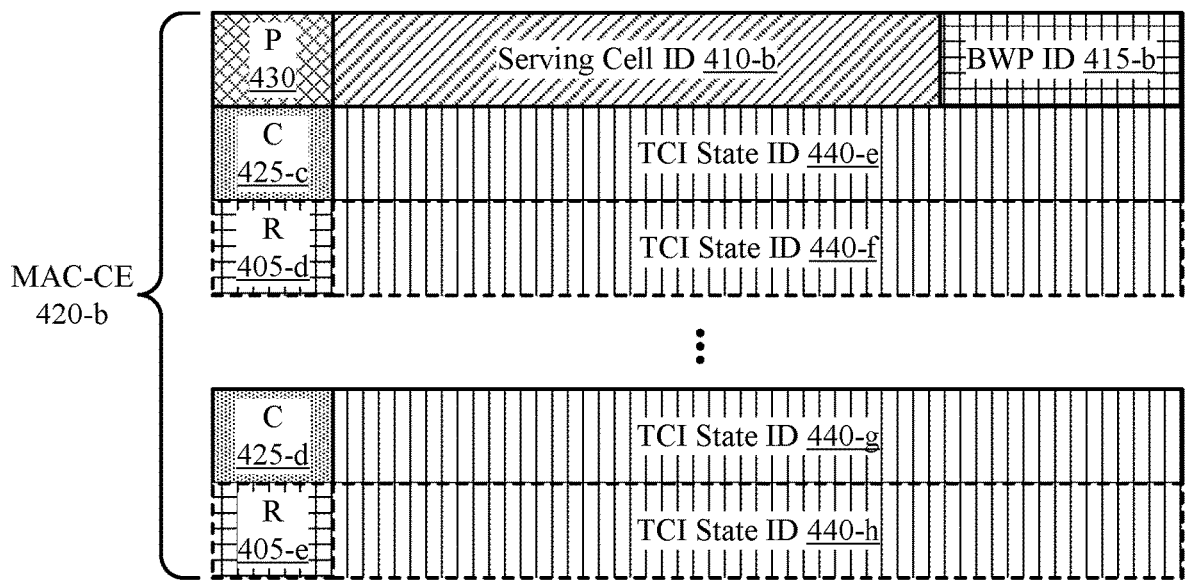

FIGS. 4A and 4B illustrate examples of configurations 400 of MAC-CEs 420 that support TCI activation for multiple transmission reception points in accordance with aspects of the present disclosure. In some examples, configurations 400 may implement aspects of wireless communications system 100 and 200 and configuration 300. For example, MAC-CEs 420 which may be examples of the MAC-CEs 220 as described with reference to FIG. 2 and may include aspects of the configurations described with reference to FIG. 3. Additionally, the MAC-CEs 420 may be transmitted from a TRP to a UE as described with reference to FIGS. 1 and 2. That is, the UE may be configured to communicate with multiple TRPs, and at least one TRP may transmit a MAC-CE 420 to the UE. Each of the MAC-CEs 420 may be configured to indicate a first set of beam configurations for a first PDSCH transmission from a first TRP and a second set of beam configurations for a second PDSCH transmission from a second TRP.

Each of the MAC-CEs 420 may be transmitted from a TRP to a UE as described with reference to FIG. 2. The MAC-CEs 420 may include reserved bits, R 405, a serving cell ID field 410, a BWP ID field 415, C-bit fields 425, and TCI state ID fields 440. The serving cell ID field 410-a may include five bits of data and may identify a serving cell for which the MAC-CE 420 is to be applied. The BWP ID field 415-a may include two bits and may indicate a downlink BWP for which the MAC-CE 420-a applies. The TCI state ID fields 440 may include a TCI state ID indicating one of the TCI states configured by an RRC message (e.g., as described with reference to FIG. 2). The C-bit fields 425 may indicate a status of the following TCI state ID fields 440. That is, if the C-bit field 425 includes a logic value '1', the following two TCI state ID field 440 may include TCI state IDs indicating activated TCI states (e.g., associated with the first set of beam configurations or the second set of beam configurations). Additionally, if the C-bit field 425 includes a logic value '0', the next TCI state ID field 440 may indicate an activated TCI state and the following TCI state ID field 440 may not indicate an activated TCI state. Here, the second TCI state ID field 440 may be excluded from the MAC-CE 420 or may be included within the MAC-CE 420 but may not include a TCI state ID value corresponding to an activated TCI state. For example, if the C-bit field 425-b within the MAC-CE 420-a indicates a logic value '0', the TCI state ID field 440-c may include TCI state ID indicating an activated TCI state. Additionally, the TCI state ID field 440-d may not be included in the MAC-CE 420-a or may not include a TCI state ID indicating an activated TCI state.

FIG. 4A illustrates a configuration 400-a of the MAC-CE 420-a. A UE may receive the MAC-CE 420-a from the TRP and determine, based on the MAC-CE 420-a, the first and second sets of beam configurations for the downlink transmission. Each of the TCI state ID fields 440 within a same row of the MAC-CE 420-a as the C-bit fields 425 may indicate beam configurations within the first set of beam configurations and each of the TCI state ID fields 440 within a different row of the MAC-CE 420-a as the C-bit fields 425 may indicate beam configurations within the second set of beam configurations. The first set of beam configurations may be applied to the downlink transmission transmitted by the same TRP that transmits the MAC-CE 420-a. Thus, the UE may identify the first set of beam configurations and the second set of beam configurations based on the position of the TCI state ID fields 440 within the MAC-CE, the values of the C-bit fields 425, and the TRP that transmits the MAC-CE 420-a. For example, if both of the C-bit fields 425-a and 425-b includes a logic value '1', the UE may identify that the first beam configuration includes the TCI states indicated by the TCI state ID fields 440-a and 440-c. Additionally, the UE may identify that the second beam configuration includes the TCI states indicated by the TCI state ID fields 440-b and 440-d. In another example, if the first C-bit field 425-a includes a logic value '0' and the second C-bit field 425-b includes a logic value '1', the UE may identify that the first beam configuration includes the TCI states indicated by the TCI state ID fields 440-a and 440-c. Additionally, the UE may identify that the second beam configuration includes the TCI state indicated by the TCI state ID field 440-d. In some cases (e.g., if the C-bit field 425-a includes a logic value '0'), the third row of the MAC-CE 420-a may not be included within the MAC-CE 420-a. That is, the MAC-CE 420-a may not include R 405-b or the TCI state ID field 440-b.

After receiving the MAC-CE 420-a, the UE may receive DCI from each of the TRPs. Each DCI may indicate one beam configuration from the first or second set of beam configurations (e.g., corresponding to the transmitting TRP). The DCI may include a set of bits (e.g., a TCI codepoint) for indicating one beam configuration from the set of beam configurations. In the example that the MAC-CE 420-a indicates a first set of beam configurations including up to eight beam configurations, the set of bits in the DCI may include three bits. Here, the set of bits may indicate a beam configuration based on the order of the TCI state ID fields 440 associated with the first set of beam configurations. An example order of the TCI state ID fields 440 associated with the first set of beam configurations may indicate that the TCI state ID field 440-a is the first TCI state ID field 440 associated with the first set of beam configurations and the TCI state ID field 440-c is the last TCI state ID field 440 associated with the first set of beam configurations. In the example of this order of the TCI state ID fields 440, if the set of bits indicate a logic value '000' (e.g., corresponding to a value of zero), the UE may use the beam configuration corresponding to the first TCI state ID field 440-a.

FIG. 4B illustrates a configuration 400-b of the MAC-CE 420-b. A UE may receive the MAC-CE 420-b from the TRP and determine, based on the MAC-CE 420-b, the first and second sets of beam configurations for the downlink transmission. Each of the TCI state ID fields 440 within a same row of the MAC-CE 420-b as the C-bit fields 425 may indicate beam configurations within the first set of beam configurations and each of the TCI state ID fields 440 within a different row of the MAC-CE 420-b as the C-bit fields 425 may indicate beam configurations within the second set of beam configurations. The first set of beam configurations may be applied to the downlink transmission transmitted by the TRP indicated by the P-bit field 430. That is, the P-bit field 430 may indicate a TRP. For example, a logic value '0' within the P-bit field 430 may indicate a first TRP while a logic value '1' may indicate a second TRP. In some cases, the P-bit field 330 may represent an index of the TRP or a group index of a CORESET associated with a TRP.

The UE may identify the first set of beam configurations and the second set of beam configurations based on the position of the TCI state ID fields 440 within the MAC-CE, the values of the C-bit fields 425, and the value included by the P-bit field 430 (e.g., an indicator bit). For example, if the value indicated by the P-bit field 430 indicates a first TRP (e.g., if the value of the P-bit field 430 is a '0' corresponding to the first TRP, as opposed to a '1' that may indicate the second TRP) and both of the C-bit fields 425-*b* and 425-*b* includes a logic value '1', the UE may identify that the first beam configuration for the first TRP includes the TCI states indicated by the TCI state ID fields 440-*e* and 440-*g*. Additionally, the UE may identify that the second beam configuration for a second TRP includes the TCI states indicated by the TCI state ID fields 440-*f* and 440-*h*. Here, the UE may ignore the P-bit field 430 if the C-bit fields 425 include a logic value '1'. In another example, if the first C-bit field 425-*b* includes a logic value '0' and the second C-bit field 425-*b* includes a logic value '1', the UE may identify that the first beam configuration includes the TCI states indicated by the TCI state ID fields 440-*e* and 440-*g*. Additionally, the UE may identify that the second beam configuration includes the TCI state indicated by the TCI state ID field 440-*h*. In some cases (e.g., if the C-bit field 425-*b* includes a logic value '0'), the third row of the MAC-CE 420-*b* may not be included within the MAC-CE 420-*b*. That is, the MAC-CE 420-*b* may not include R 405-*d* or the TCI state ID field 440-*f*. In the example that a C-bit field 425 includes a logic value '0', the following TCI state ID field 440 may activate a TCI state for the TRP indicated by the P-bit field 430.

After receiving the MAC-CE 420-*b*, the UE may receive DCI from each of the TRPs. Each DCI may indicate one beam configuration from the first or second set of beam configurations (e.g., corresponding to the transmitting TRP). The DCI may include a set of bits (e.g., a TCI codepoint) for indicating one beam configuration from the set of beam configurations. In the example that the MAC-CE 420-*b* indicates a second set of beam configuration including up to eight beam configurations, the set of bits in the DCI may include three bits. Here, the set of bits may indicate a beam configuration based on the order of the TCI state ID fields 440 associated with the second set of beam configurations. An example order of the TCI state ID fields 440 associated with the first set of beam configurations may indicate that the TCI state ID field 440-*f* is the first TCI state ID field 440 associated with the second set of beam configurations and the TCI state ID field 440-*h* is the last TCI state ID field 440 associated with the second set of beam configurations. In the example of this order of the TCI state ID fields 440, if the set of bits indicate a logic value '001' (e.g., corresponding to a value of one), the UE may use the beam configuration corresponding to the second TCI state ID field 440.

Figure 5A:
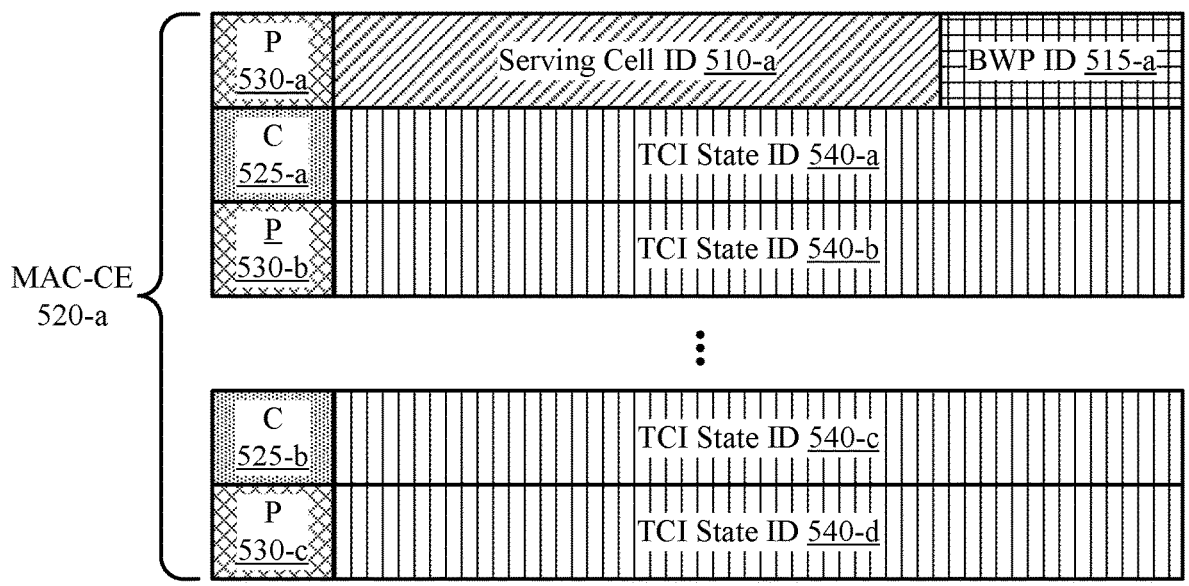
Figure 5B:
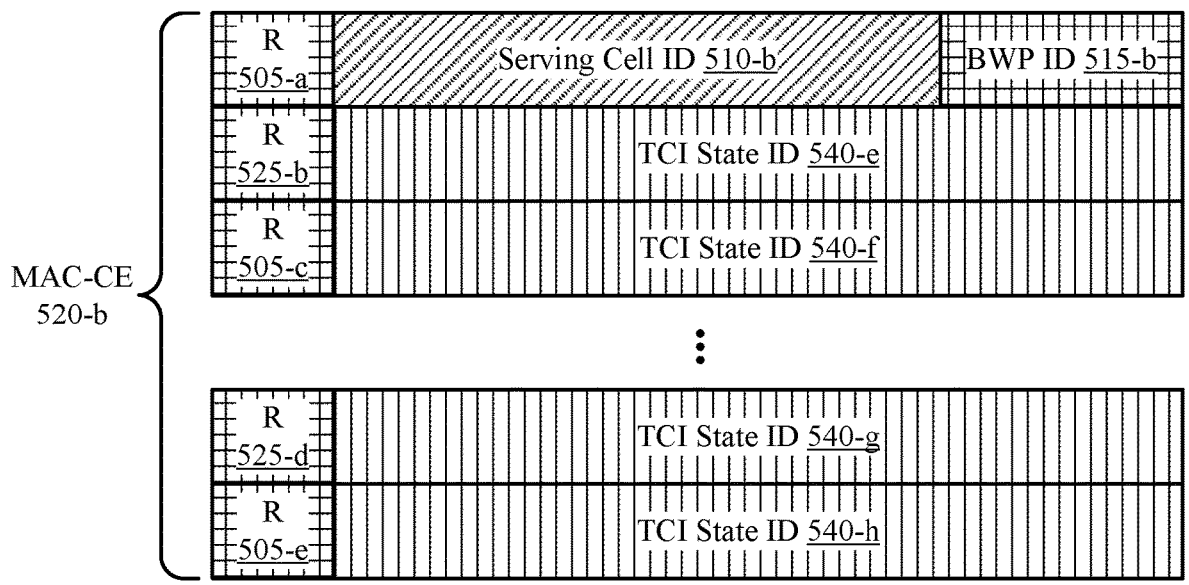

FIGS. 5A and 5B illustrate examples of configurations 500 of MAC-CEs 520 that support TCI activation for multiple transmission reception points in accordance with aspects of the present disclosure. In some examples, configurations 500 may implement aspects of wireless communications system 100 and 200 and configurations 300 and 400. For example, MAC-CEs 520 may be examples of the MAC-CEs 220 as described with reference to FIG. 2 and may include aspects of the configurations as described with reference to FIGS. 3 and 4. Additionally, the MAC-CEs 520 may be transmitted from a TRP to a UE as described with reference to FIGS. 1 and 2. That is, the UE may be configured to communicate with multiple TRPs, and at least one TRP may transmit a MAC-CE 520 to the UE. Each of the MAC-CEs 520 may be configured to indicate a first set of beam configurations for a first PDSCH transmission from a first TRP and a second set of beam configurations for a second PDSCH transmission from a second TRP.

Each of the MAC-CEs 520 may be transmitted from a TRP to a UE as described with reference to FIG. 2. The MAC-CEs 520 may include a serving cell ID field 510, a BWP ID field 515, and TCI state ID fields 540. The serving cell ID field 510-*a* may include five bits of data and may identify a serving cell for which the MAC-CE 520 is to be applied. The BWP ID field 515-*a* may include two bits and may indicate a downlink BWP for which the MAC-CE 520-*a* applies. The TCI state ID fields 540 may include a TCI state ID indicating one of the TCI states configured by an RRC message (e.g., as described with reference to FIG. 2).

FIG. 5A illustrates a configuration 500-*a* of the MAC-CE 520-*a*. A UE may receive the MAC-CE 520-*a* from the TRP and determine, based on the MAC-CE 520-*a*, the first and second sets of beam configurations for the downlink transmission. The MAC-CE 520-*a* may include C-bit fields 525. The C-bit fields 525 may indicate a status of the following TCI state ID fields 540. That is, if the C-bit field 525 includes a logic value '1', the following two TCI state ID fields 540 may include TCI state IDs indicating activated TCI states (e.g., associated with the first set of beam configurations or the second set of beam configurations). Additionally, if the C-bit field 525 includes a logic value '0', the next TCI state ID field 540 may indicate an activated TCI state and the TCI state ID field 540 in the following row of the MAC-CE 520-*a* may not indicate an activated TCI state. Here, the second TCI state ID field 540 may be excluded from the MAC-CE 520 or may be included within the MAC-CE 520 but may not include a TCI state ID value corresponding to an activated TCI state. For example, if the C-bit field 525-*b* within the MAC-CE 520-*a* indicates a logic value '0', the TCI state ID 540-*c* may include TCI state ID indicating an activated TCI state. Additionally, the TCI state ID 540-*a* may not be included in the MAC-CE 520-*a* or may not include a TCI state ID 540 indicating an activated TCI state.

Each of the P-bit fields 530 may indicate which beam configuration an indicated TCI state ID field 540 is associated with. In a first case, the P-bit fields 530 may indicate a TRP associated with either the first or second beam configurations for the TCI state ID 540-*b* in the same row of the MAC-CE 520-*a*. For example, if the P-bit field 530-*b* indicates a TRP associated with the first set of beam configurations and the C-bit field 525-*a* includes a logic value '1', the UE may determine that the TCI state ID field 540-*b* indicates an activated TCI state within the first set of beam configurations and that the TCI state ID field 540-*a* indicates an activated TCI state within the second set of beam configurations. In another case, the P-bit fields 530 may indicate a TRP associated with either the first or second beam configurations for the TCI state ID field 540-*b* in the prior row of the MAC-CE 520-*a*. For example, if the P-bit field 530-*c* indicates a TRP associated with the second set of beam configurations and the C-bit field 525-*b* includes a logic value '1', the UE may determine that the TCI state ID field 540-*c* indicates an activated TCI state within the second set of beam configurations and the TCI state ID field 540-*d* indicates an activated TCI state within the first set of beam configurations. If the C-bit field 525 includes a logic value '0', the UE may determine that the TCI state ID field 540 in the same row of the MAC-CE 520-*a* is associated with the set of beam configurations associated with the TRP indicated by the first P-bit field 530 (e.g., P-bit field 530-*a*). In some cases, the P-bit field 530 may represent an index of the TRP or a group index of a CORESET associated with a TRP.

After receiving the MAC-CE 520-*a*, the UE may receive DCI from each of the TRPs. Each DCI may indicate one beam configuration from the first or second set of beam configurations (e.g., corresponding to the transmitting TRP). The DCI may include a set of bits (e.g., a TCI codepoint) for indicating one beam configuration from the set of beam configurations. The set of bits may indicate a beam configuration based on the order of the TCI state ID fields 540 associated with the first set of beam configurations.

FIG. 5B illustrates a configuration 500-*b* of the MAC-CE 520-*b*. A UE may receive the MAC-CE 520-*b* from the TRP and determine, based on the MAC-CE 520-*b*, the first and second sets of beam configurations for the downlink transmission. The MAC-CE 520-*b* may include a set of reserved R bits 505. The configuration 500-*b* may be preconfigured such that the TCI state ID fields 540 in the odd rows of the MAC-CE 520-*b* indicate activated TCI states for the first set of beam configurations and the TCI state ID fields 540 in the even rows of the MAC-CE 520-*b* indicate activated TCI states for the second set of beam configurations. In the example of the configuration 300-*b*, the UE may identify the first set of beam configurations and the second set of beam configurations based on the position of the TCI state ID fields 540 within the MAC-CE 520-*b*. After receiving the MAC-CE 520-*a*, the UE may receive DCI from each of the TRPs. Each DCI may indicate one beam configuration from the first or second set of beam configurations (e.g., corresponding to the transmitting TRP). The DCI may include a set of bits (e.g., a TCI codepoint) for indicating one beam configuration from the set of beam configurations. The set of bits may indicate a beam configuration based on the order of the TCI state ID fields 540 associated with the first set of beam configurations.

Figure 6:
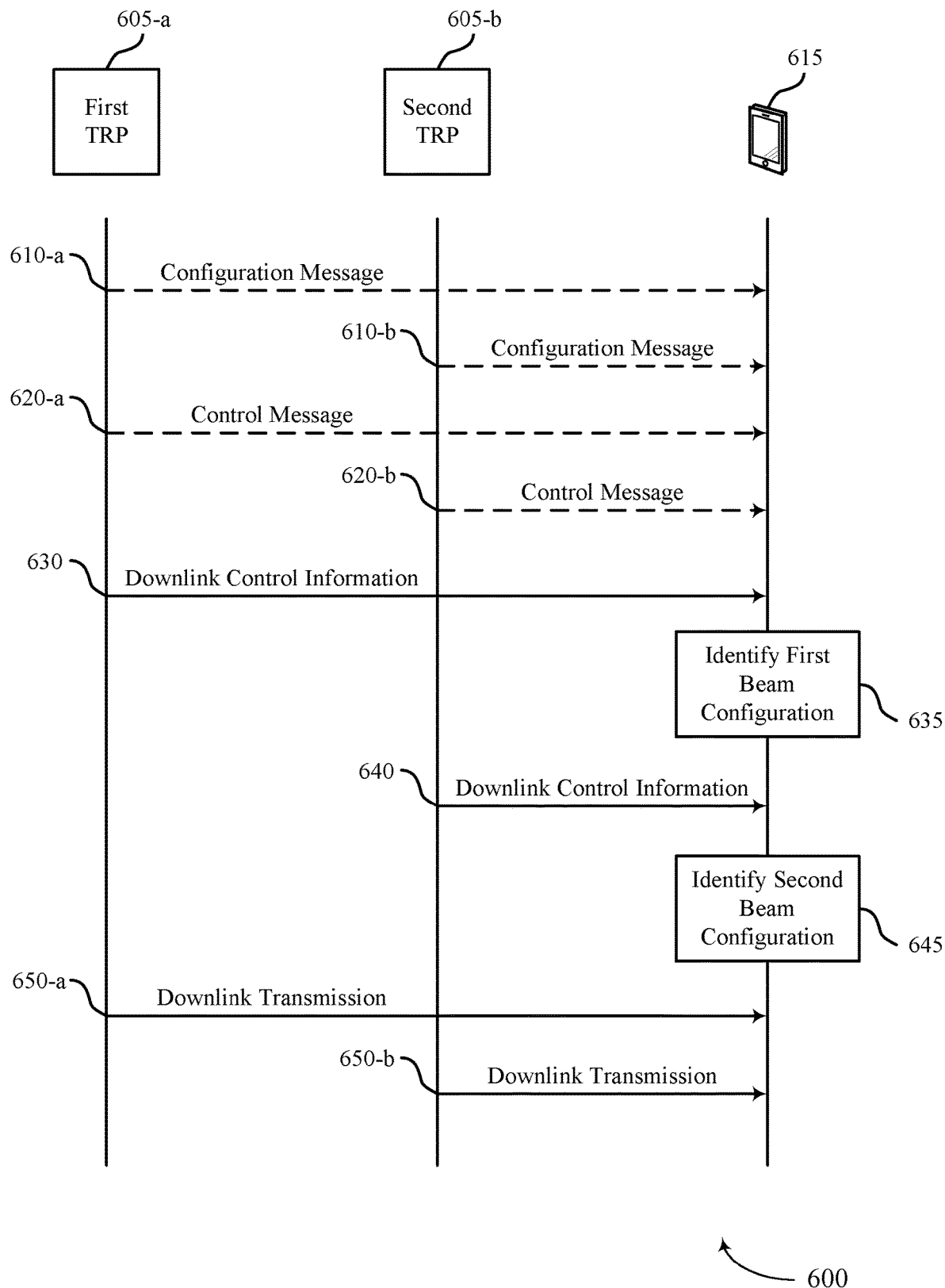
FIG. 6 illustrates an example of a process flow that supports TCI state activation for multiple transmission reception points in accordance with aspects of the present disclosure.

FIG. 6 illustrates an example of a process flow 600 that supports TCI activation for multiple transmission reception points. In some examples, the process flow 600 may implement aspects of FIGS. 1 through 5. For example, the process flow 600 may include signaling between a UE 615 and TRPs 605, which may be examples of UEs and TRPs as described with reference to FIGS. 1 and 2. Additionally, some of the signaling illustrated by the process flow 600 may implement a configuration as described with reference to FIGS. 3 through 5.

At 610-*a*, the first TRP 605-*a* may optionally transmit a configuration message (e.g., an RRC message) to the UE 615. Alternatively, at 610-*b*, the second TRP 605-*a* may optionally transmit the configuration message to the UE 615. The configuration message may indicate a set of beam configurations associated with a first downlink shared channel (e.g., used by the first TRP 605-*a*) and a second downlink shared channel (e.g., used by the second TRP 605-*b*).

At 620-*a* the first TRP 605-*a* may optionally transmit a control message (e.g., a MAC-CE) to the UE 615. At 620-*b* the second TRP 605-*b* may optionally transmit a control message to the UE 615. That is, at 620, the UE 615 may receive at least one control message from the first TRP 605-*a*, the second TRP 605-*b*, or both TRPs 605. The at least one control message may indicate a first set of beam configurations associated with the first downlink shared channel from the first TRP 605-*a* and a second set of beam configurations associated with the second downlink shared channel from the second TRP 605-*b*. The first and second sets of beam configurations may indicate beam configurations for the set of beam configurations configured by the configuration message (e.g., the RRC message).

In one example, the UE 615 may receive a first control message indicating the first set of beam configurations and may receive a second control message from the second TRP 605-*b* indicating the second set of beam configurations. In another example, the UE 615 may receive a single control message indicating the first and second sets of beam configurations.

At 630, first TRP 605-*a* may transmit first DCI to the UE 615. The first DCI may schedule a first downlink transmission on the first downlink shared channel and may indicate a first beam configuration of the first set of beam configurations.

At 635, the UE 615 may identify the first beam configuration. In some cases, the UE 615 may identify the first beam configuration based on a mapping between one or more bits within the first DCI and the first set of beam configurations.

At 640, the second TRP 605-*b* may transmit second DCI to the UE 615. The second DCI may schedule a second downlink transmission on the second downlink shared channel and may indicate a second beam configuration of the second set of beam configurations.

At 645, the UE 615 may identify the second beam configuration. In some cases, the UE 615 may identify the second beam configuration based on a mapping between one or more bits within the second DCI and the second set of beam configurations.

At 650-*a*, the UE 615 may receive the first downlink transmission from the first TRP 605-*a* according to the first beam configuration. Additionally, the UE 615 may decode the first scheduled downlink transmission from the first downlink shared channel according to the first beam configuration.

At 650-*b*, the UE 615 may receive the second downlink transmission from the second TRP 605-*b* according to the second beam configuration. Additionally, the UE 615 may decode the second scheduled downlink transmission from the second downlink shared channel according to the second beam configuration.

Figure 7:
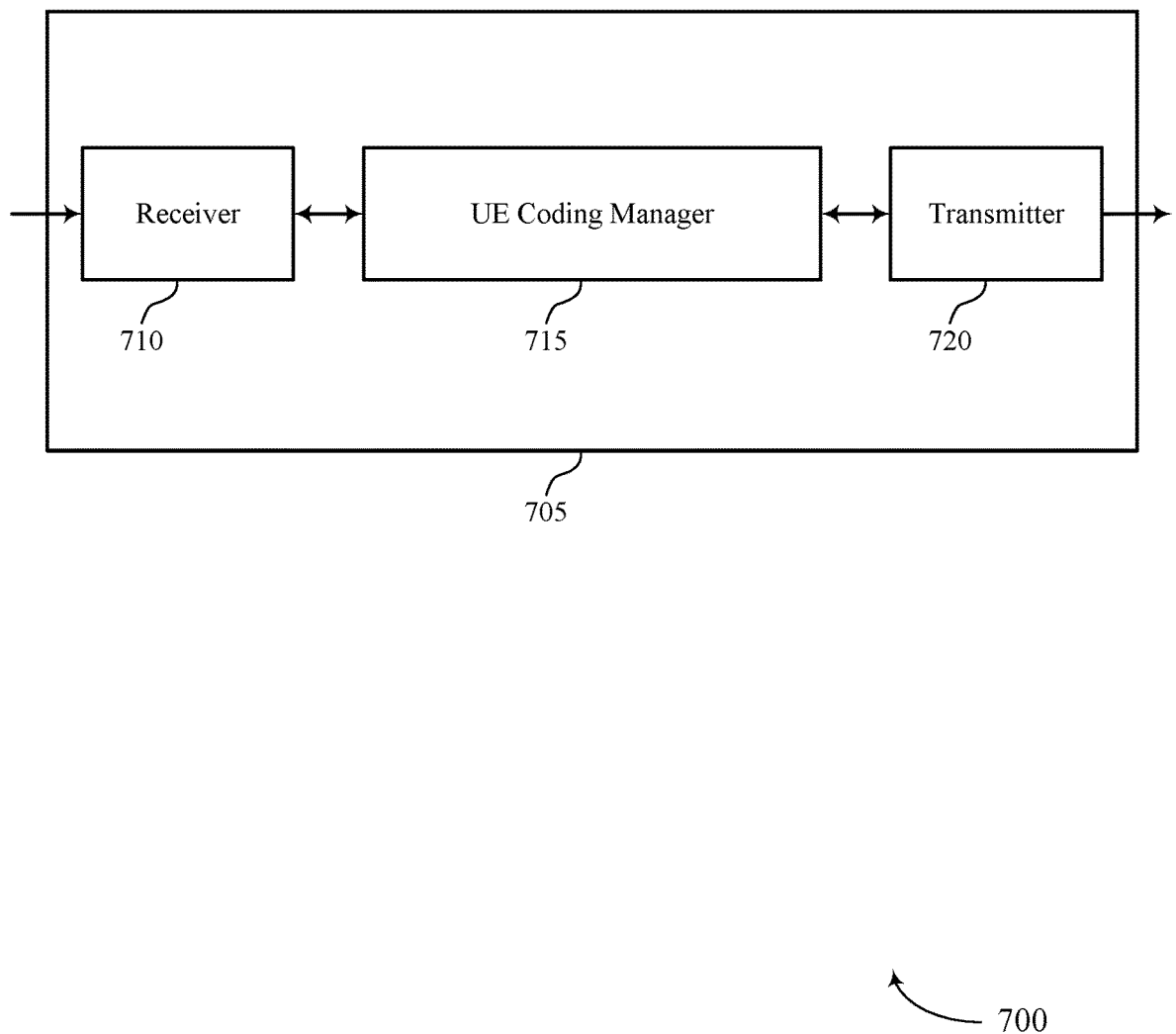
FIGS. 7 and 8 show block diagrams of devices that support TCI state activation for multiple transmission reception points in accordance with aspects of the present disclosure.

FIG. 7 shows a block diagram 700 of a device 705 that supports TCI state activation for multiple transmission reception points in accordance with aspects of the present disclosure. The device 705 may be an example of aspects of a UE 115 as described herein. The device 705 may include a receiver 710, an UE coding manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to TCI state activation for multiple transmission reception points, etc.). Information may be passed on to other components of the device 705. The receiver 710 may be an example of aspects of the transceiver 1020 described with reference to FIG. 10. The receiver 710 may utilize a single antenna or a set of antennas.

The UE coding manager 715 may receive at least one control message indicating a first set of beam configurations associated with a first downlink shared channel from a first TRP and a second set of beam configurations associated with a second downlink shared channel from a second TRP, receive, from the first TRP, a first DCI scheduling a first downlink transmission on the first downlink shared channel, the first DCI indicating a first beam configuration of the first set of beam configurations, receive, from the second TRP, a second DCI scheduling a second downlink transmission on the second downlink shared channel, the second DCI indicating a second beam configuration of the second set of beam configurations, decode the first scheduled downlink transmission from the first downlink shared channel according to the first beam configuration, and decode the second scheduled downlink transmission from the second downlink shared channel according to the second beam configuration. The UE coding manager 715 may be an example of aspects of the UE coding manager 1010 described herein. The actions performed by the UE coding manager 715 as described herein may be implemented to realize one or more potential advantages. One implementation may allow TRPs to dynamically update beam configurations for subsequent downlink transmissions. The dynamic configurations may enable the UE to maintain communications with a base station through one or more TRPs in changing conditions.

The UE Coding Manager 715, or its sub-components, may be implemented in hardware, code (e.g., software or firmware) executed by a processor, or any combination thereof. If implemented in code executed by a processor, the functions of the UE Coding Manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE Coding Manager 715, or its sub-components, may be physically located at various positions, including being distributed such that portions of functions are implemented at different physical locations by one or more physical components. In some examples, the UE Coding Manager 715, or its sub-components, may be a separate and distinct component in accordance with various aspects of the present disclosure. In some examples, the UE Coding Manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
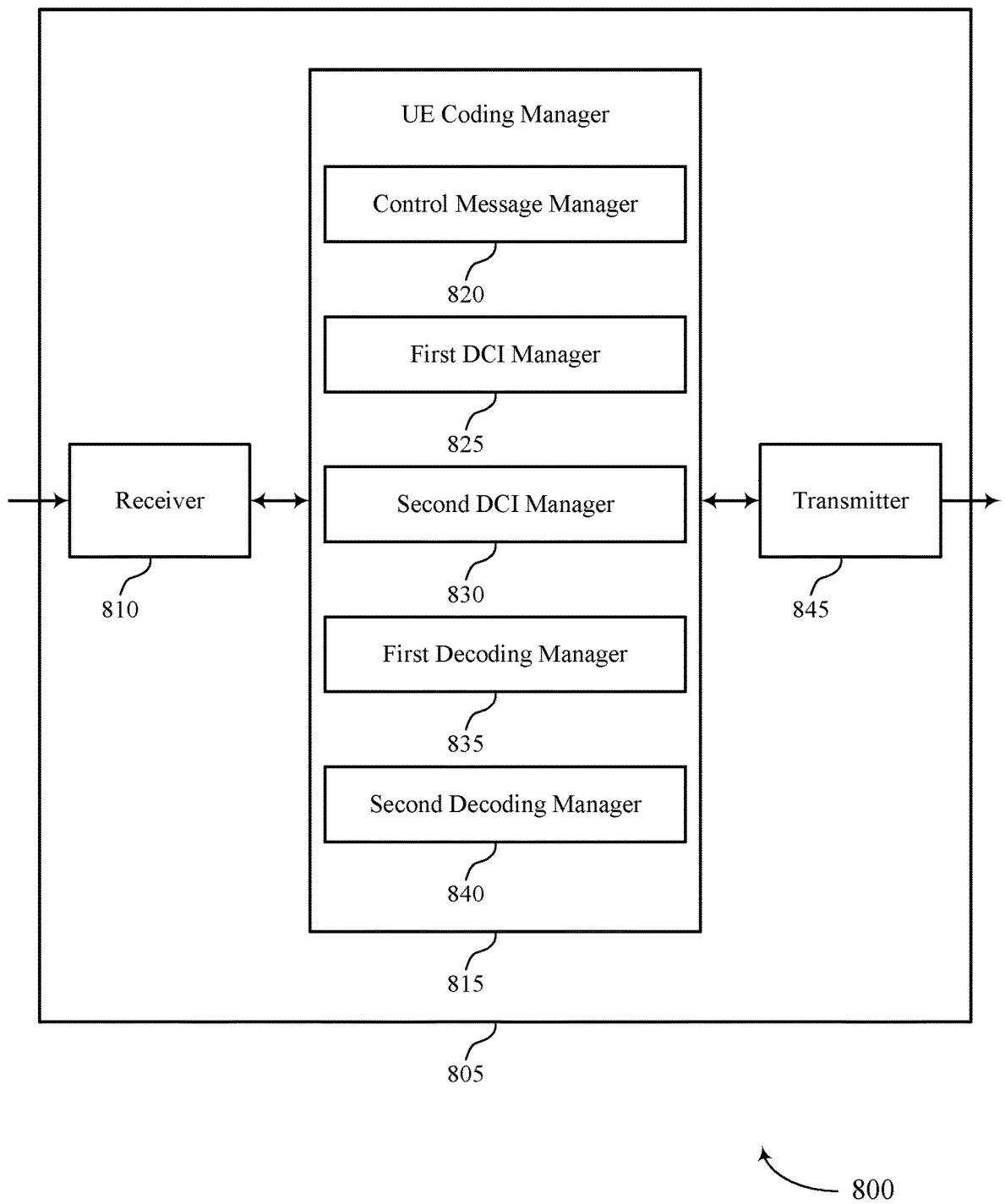

FIG. 8 shows a block diagram 800 of a device 805 that supports TCI state activation for multiple transmission reception points in accordance with aspects of the present disclosure. The device 805 may be an example of aspects of a device 705, or a UE 115 as described herein. The device 805 may include a receiver 810, an UE coding manager 815, and a transmitter 845. The device 805 may also include a processor. Each of these components may be in communication with one another (e.g., via one or more buses).

The receiver 810 may receive information such as packets, user data, or control information associated with various information channels (e.g., control channels, data channels, and information related to TCI state activation for multiple transmission reception points, etc.). Information may be passed on to other components of the device 805. The receiver 810 may be an example of aspects of the transceiver 1020 described with reference to FIG. 10. The receiver 810 may utilize a single antenna or a set of antennas.

The UE coding manager 815 may be an example of aspects of the UE Coding Manager 715 as described herein. The UE coding manager 815 may include a control message manager 820, a first DCI manager 825, a second DCI manager 830, a first decoding manager 835, and a second decoding manager 840. The UE coding manager 815 may be an example of aspects of the UE coding manager 1010 described herein.

The control message manager 820 may receive at least one control message indicating a first set of beam configurations associated with a first downlink shared channel from a first TRP and a second set of beam configurations associated with a second downlink shared channel from a second TRP.

The first DCI manager 825 may receive, from the first TRP, a first DCI scheduling a first downlink transmission on the first downlink shared channel, the first DCI indicating a first beam configuration of the first set of beam configurations.

The second DCI manager 830 may receive, from the second TRP, a second DCI scheduling a second downlink transmission on the second downlink shared channel, the second DCI indicating a second beam configuration of the second set of beam configurations.

The first decoding manager 835 may decode the first scheduled downlink transmission from the first downlink shared channel according to the first beam configuration.

The second decoding manager 840 may decode the second scheduled downlink transmission from the second downlink shared channel according to the second beam configuration.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
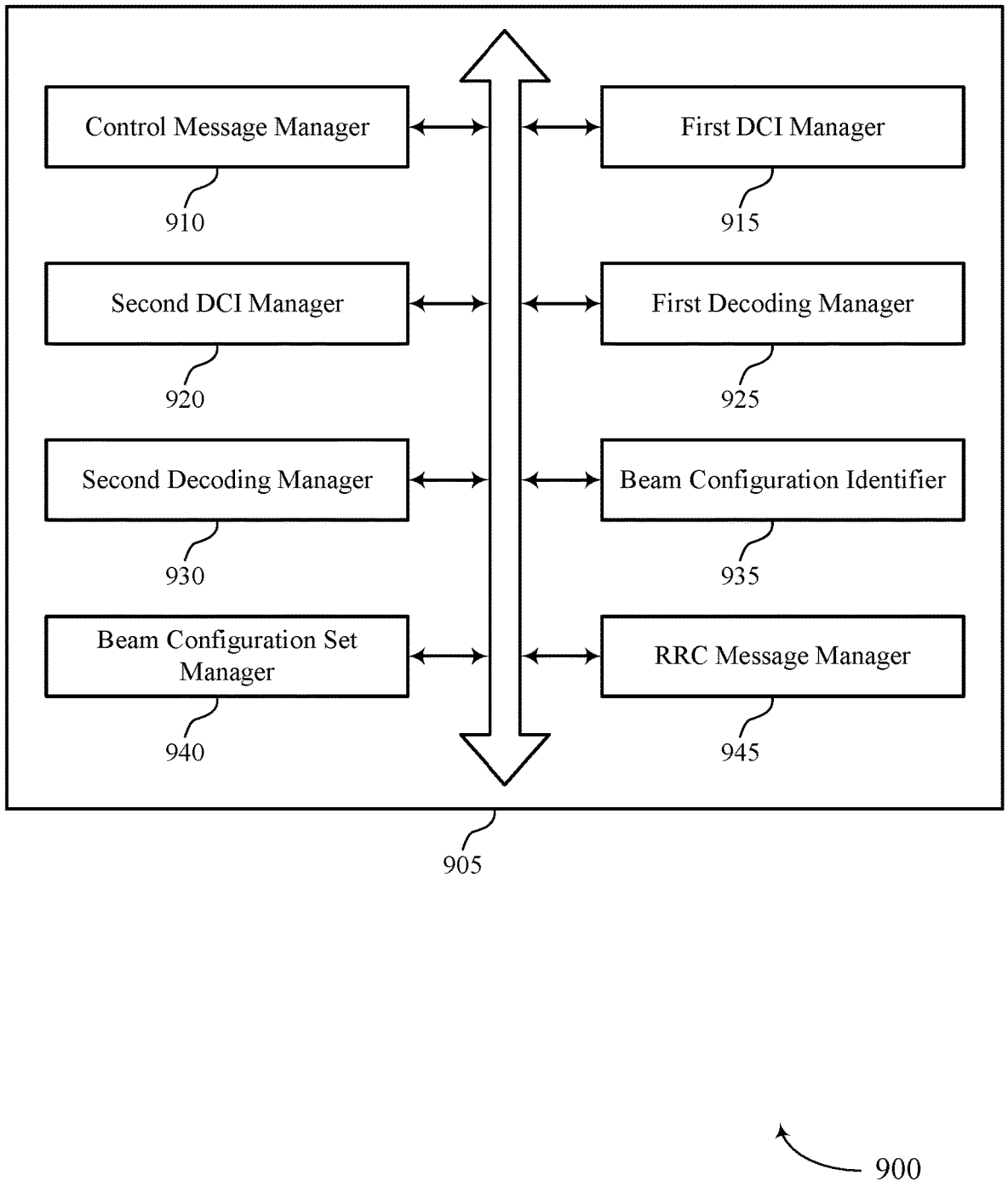
FIG. 9 shows a block diagram of a user equipment (UE) coding manager that supports TCI state activation for multiple transmission reception points in accordance with aspects of the present disclosure.

FIG. 9 shows a block diagram 900 of a UE coding manager 905 that supports TCI state activation for multiple transmission reception points in accordance with aspects of the present disclosure. The UE coding manager 905 may be an example of aspects of a UE coding manager 715, a UE coding manager 815, or a UE coding manager 1010 described herein. The UE coding manager 905 may include a control message manager 910, a first DCI manager 915, a second DCI manager 920, a first decoding manager 925, a second decoding manager 930, a beam configuration identifier 935, a beam configuration set manager 940, and a RRC message manager 945. Each of these modules may communicate, directly or indirectly, with one another (e.g., via one or more buses).

The control message manager 910 may receive at least one control message indicating a first set of beam configurations associated with a first downlink shared channel from a first TRP and a second set of beam configurations associated with a second downlink shared channel from a second TRP. In some examples, the control message manager 910 may receive a first control message including a first indication of the first set of beam configurations. In some cases, the control message manager 910 may receive a second control message including a second indication of the second set of beam configurations. In some instances, receiving the first control message further includes receiving the first control message from the first TRP. In some examples, receiving the second control message further includes receiving the second control message from the second TRP. In some cases, the control message manager 910 may receive one control message including a first indication of the first set of beam configurations and a second indication of the second set of beam configurations. In some instances, the control message manager 910 may receive the one control message from the first TRP.

In some examples, the control message manager 910 may receive the one control message from the second TRP. In some cases, the at least one control message includes an indicator bit corresponding to each of the set of beam configurations. In some instances, the at least one control message indicates the first set of beam configurations and the second set of beam configurations based on a value of each of the indicator bits corresponding to each of the set of beam configurations. In some examples, each of the one control message includes a first set of identifiers identifying each beam configuration within the first set of beam configurations and a second set of identifiers identifying each beam configuration within the second set of beam configurations. In some cases, the first set of beam configurations includes a set of TCI states. In some instances, the at least one control message includes a MAC-CE.

The first DCI manager 915 may receive, from the first TRP, a first DCI scheduling a first downlink transmission on the first downlink shared channel, the first DCI indicating a first beam configuration of the first set of beam configurations.

The second DCI manager 920 may receive, from the second TRP, a second DCI scheduling a second downlink transmission on the second downlink shared channel, the second DCI indicating a second beam configuration of the second set of beam configurations.

The first decoding manager 925 may decode the first scheduled downlink transmission from the first downlink shared channel according to the first beam configuration.

The second decoding manager 930 may decode the second scheduled downlink transmission from the second downlink shared channel according to the second beam configuration.

The beam configuration identifier 935 may identify the first beam configuration from the first set of beam configurations based on a mapping between one or more bits within the first DCI and the first set of beam configurations indicated by the first control message. In some examples, the beam configuration identifier 935 may identify the second beam configuration from the second set of beam configurations based on a mapping between one or more bits within the second DCI and the second set of beam configurations indicated by the second control message. In some cases, the beam configuration identifier 935 may identify the first beam configuration from the first set of beam configurations based on a mapping between one or more bits within the first DCI and the first set of beam configurations indicated by the one control message. In some instances, the beam configuration identifier 935 may identify the second beam configuration from the second set of beam configurations based on a mapping between one or more bits within the second DCI and the second set of beam configurations indicated by the one control message.

The beam configuration set manager 940 may determine that the first set of beam configurations are associated with the first downlink shared channel from the first TRP based on receiving the first control message from the first TRP. In some examples, the beam configuration set manager 940 may determine that the second set of beam configurations are associated with the second downlink shared channel from the second TRP based on receiving the second control message from the second TRP. In some cases, the beam configuration set manager 940 may determine that the first set of beam configurations are associated with the first downlink shared channel from the first TRP based on a first value of an indicator bit within the first control message indicating the first TRP. In some instances, the beam configuration set manager 940 may determine that the second set of beam configurations are associated with the second downlink shared channel from the second TRP based on a second value of the indicator bit within the second control message indicating the second TRP.

In some examples, the beam configuration set manager 940 may determine that the first set of identifiers identify each beam configuration within the first set of beam configurations based on a position of the first set of identifiers within the one control message and receiving the one control message from the first TRP. In some cases, the beam configuration set manager 940 may determine that the second set of identifiers identify each beam configuration within the second set of beam configurations based on a position of the second set of identifiers within the one control message and receiving the one control message from the first TRP. In some instances, the beam configuration set manager 940 may determine that the first set of identifiers identify each beam configuration within the first set of beam configurations based on at least one of a position of the first set of identifiers within the one control message or one or more indicator bits within the one control message indicating the first TRP or the second TRP. In some examples, the beam configuration set manager 940 may determine that the second set of identifiers identify each beam configuration within the second set of beam configurations based on at least one of a position of the second set of identifiers within the one control message or the one or more indicator bits within the one control message indicating the first TRP or the second TRP. In some cases, the one or more indicator bits include one indicator bit. In some examples, the one or more indicator bits include two or more indicator bits. In some instances, each indicator bit corresponds to at least one identifier of the first set of identifiers or the second set of identifiers.

The RRC message manager 945 may receive a configuration message indicating a set of beam configurations associated with the first downlink shared channel and the second downlink shared channel, where the at least one control message indicates the first set of beam configurations and the second set of beam configurations from the set of beam configurations. In some cases, the configuration message is an RRC message.

Figure 10:
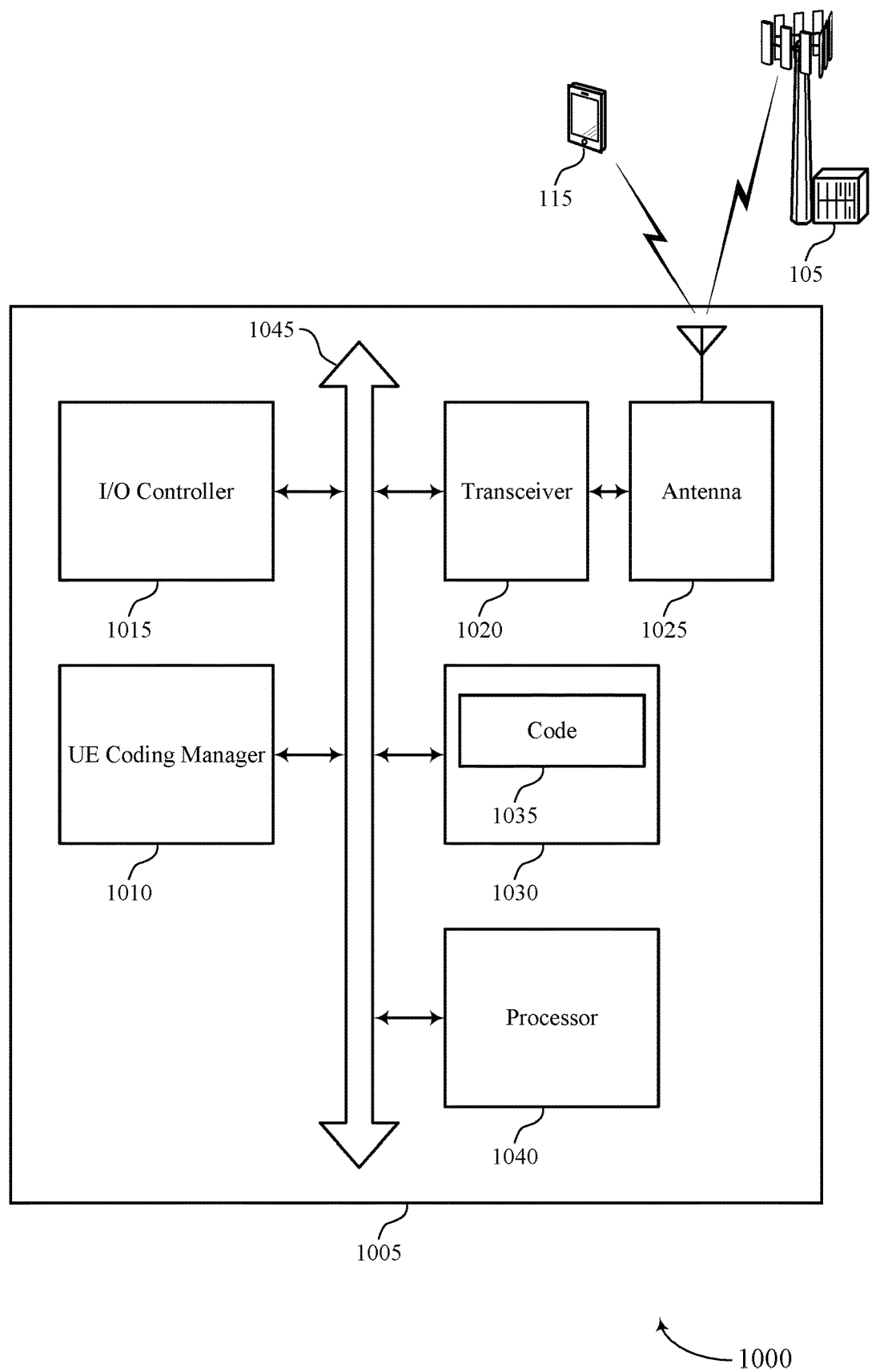
FIG. 10 shows a diagram of a system including a device that supports TCI state activation for multiple transmission reception points in accordance with aspects of the present disclosure.

FIG. 10 shows a diagram of a system 1000 including a device 1005 that supports TCI state activation for multiple transmission reception points in accordance with aspects of the present disclosure. The device 1005 may be an example of or include the components of device 705, device 805, or a UE 115 as described herein. The device 1005 may include components for bi-directional voice and data communications including components for transmitting and receiving communications, including an UE coding manager 1010, an I/O controller 1015, a transceiver 1020, an antenna 1025, memory 1030, and a processor 1040. These components may be in electronic communication via one or more buses (e.g., bus 1045).

The UE coding manager 1010 may receive at least one control message indicating a first set of beam configurations associated with a first downlink shared channel from a first TRP and a second set of beam configurations associated with a second downlink shared channel from a second TRP, receive, from the first TRP, a first DCI scheduling a first downlink transmission on the first downlink shared channel, the first DCI indicating a first beam configuration of the first set of beam configurations, receive, from the second TRP, a second DCI scheduling a second downlink transmission on the second downlink shared channel, the second DCI indicating a second beam configuration of the second set of beam configurations, decode the first scheduled downlink transmission from the first downlink shared channel according to the first beam configuration, and decode the second scheduled downlink transmission from the second downlink shared channel according to the second beam configuration.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting TCI state activation for multiple transmission reception points).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
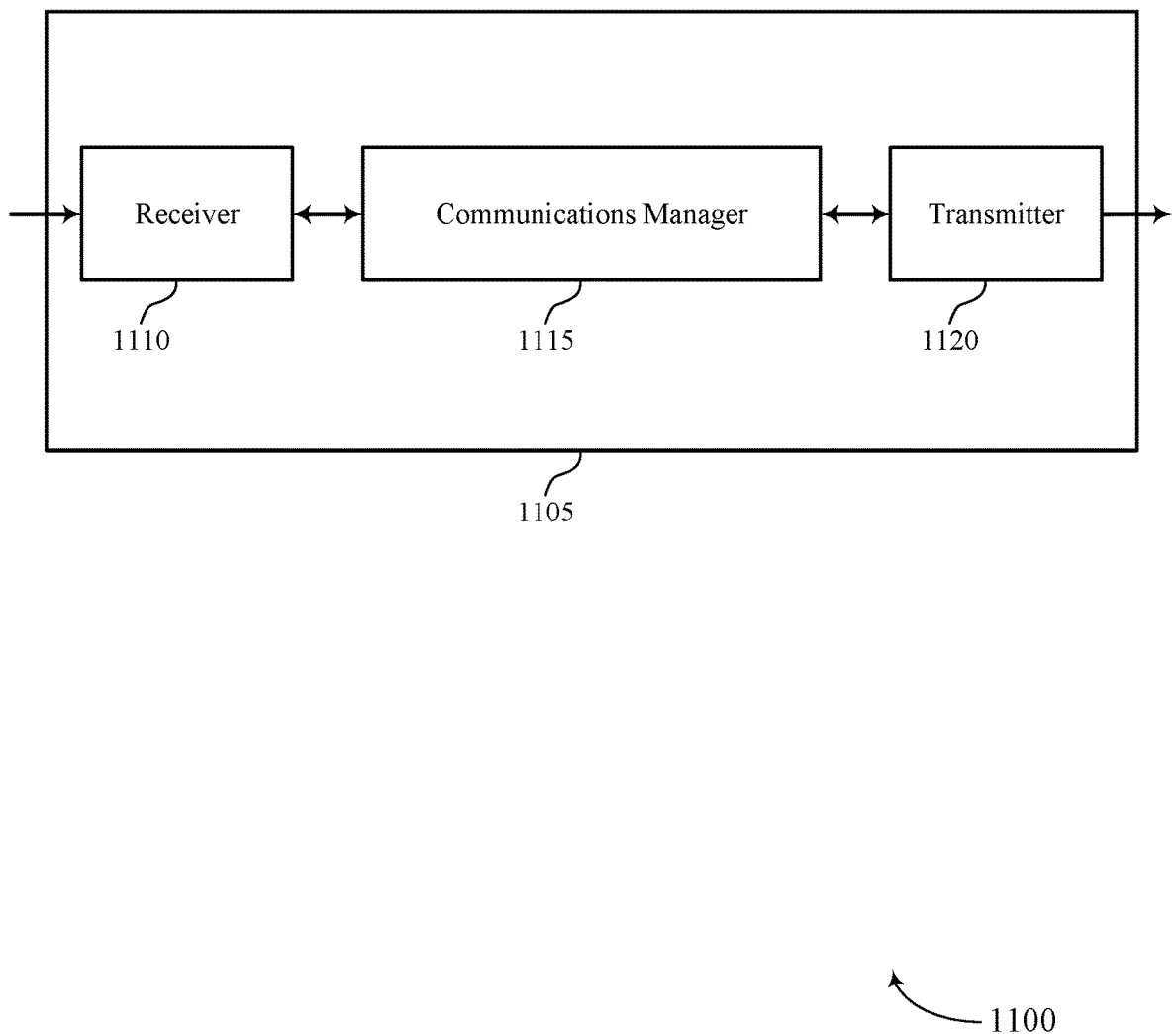
FIGS. 11 and 12 show block diagrams of devices that support TCI state activation for multiple transmission reception points in accordance with aspects of the present disclosure.

FIG. 11 shows a block diagram 1100 of a device 1105 that supports TCI state activation for multiple transmission reception points in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to TCI state activation for multiple transmission reception points, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit at least one control message indicating a first set of beam configurations associated with a first downlink shared channel from a first TRP and a second set of beam configurations associated with a second downlink shared channel from a second TRP, transmit, by the first TRP, a first DCI scheduling a first downlink transmission on the first downlink shared channel, the first DCI indicating a first beam configuration of the first set of beam configurations, transmit, by the second TRP, a second DCI scheduling a second downlink transmission on the second downlink shared channel, the second DCI indicating a second beam configuration of the second set of beam configurations, transmit the first scheduled downlink transmission by the first downlink shared channel according to the first beam configuration, and transmit the second scheduled downlink transmission by the second downlink shared channel according to the second beam configuration. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
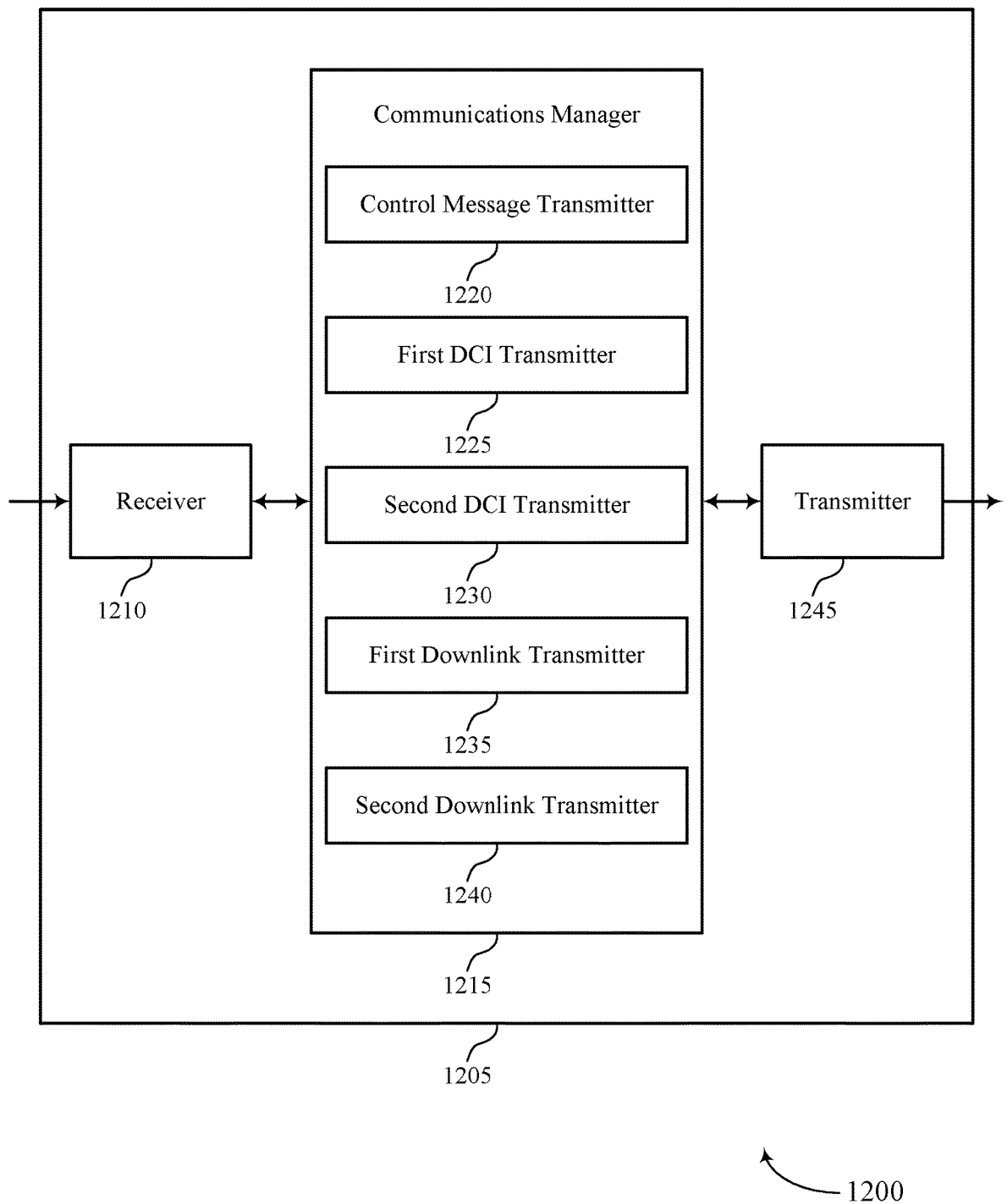

FIG. 12 shows a block diagram 1200 of a device 1205 that supports TCI state activation for multiple transmission reception points in accordance with aspects of the present disclosure. The device 1205 may be an example of aspects of a device 1105, or a base station 105 as described herein. The device 1205 may include a receiver 1210, a communications manager 1215, and a transmitter 1245. The device 1205 may also include a processor. Each of these components may be in communication with one another (e.g., via one or more buses).

The receiver 1210 may receive information such as packets, user data, or control information associated with various information channels (e.g., control channels, data channels, and information related to TCI state activation for multiple transmission reception points, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a control message transmitter 1220, a first DCI transmitter 1225, a second DCI transmitter 1230, a first downlink transmitter 1235, and a second downlink transmitter 1240. The communications manager 1215 may be an example of aspects of the communications manager 1410 described herein.

The control message transmitter 1220 may transmit at least one control message indicating a first set of beam configurations associated with a first downlink shared channel from a first TRP and a second set of beam configurations associated with a second downlink shared channel from a second TRP.

The first DCI transmitter 1225 may transmit, by the first TRP, a first DCI scheduling a first downlink transmission on the first downlink shared channel, the first DCI indicating a first beam configuration of the first set of beam configurations.

The second DCI transmitter 1230 may transmit, by the second TRP, a second DCI scheduling a second downlink transmission on the second downlink shared channel, the second DCI indicating a second beam configuration of the second set of beam configurations.

The first downlink transmitter 1235 may transmit the first scheduled downlink transmission by the first downlink shared channel according to the first beam configuration.

The second downlink transmitter 1240 may transmit the second scheduled downlink transmission by the second downlink shared channel according to the second beam configuration.

The transmitter 1245 may transmit signals generated by other components of the device 1205. In some examples, the transmitter 1245 may be collocated with a receiver 1210 in a transceiver module. For example, the transmitter 1245 may be an example of aspects of the transceiver 1420 described with reference to FIG. 14. The transmitter 1245 may utilize a single antenna or a set of antennas.

Figure 13:
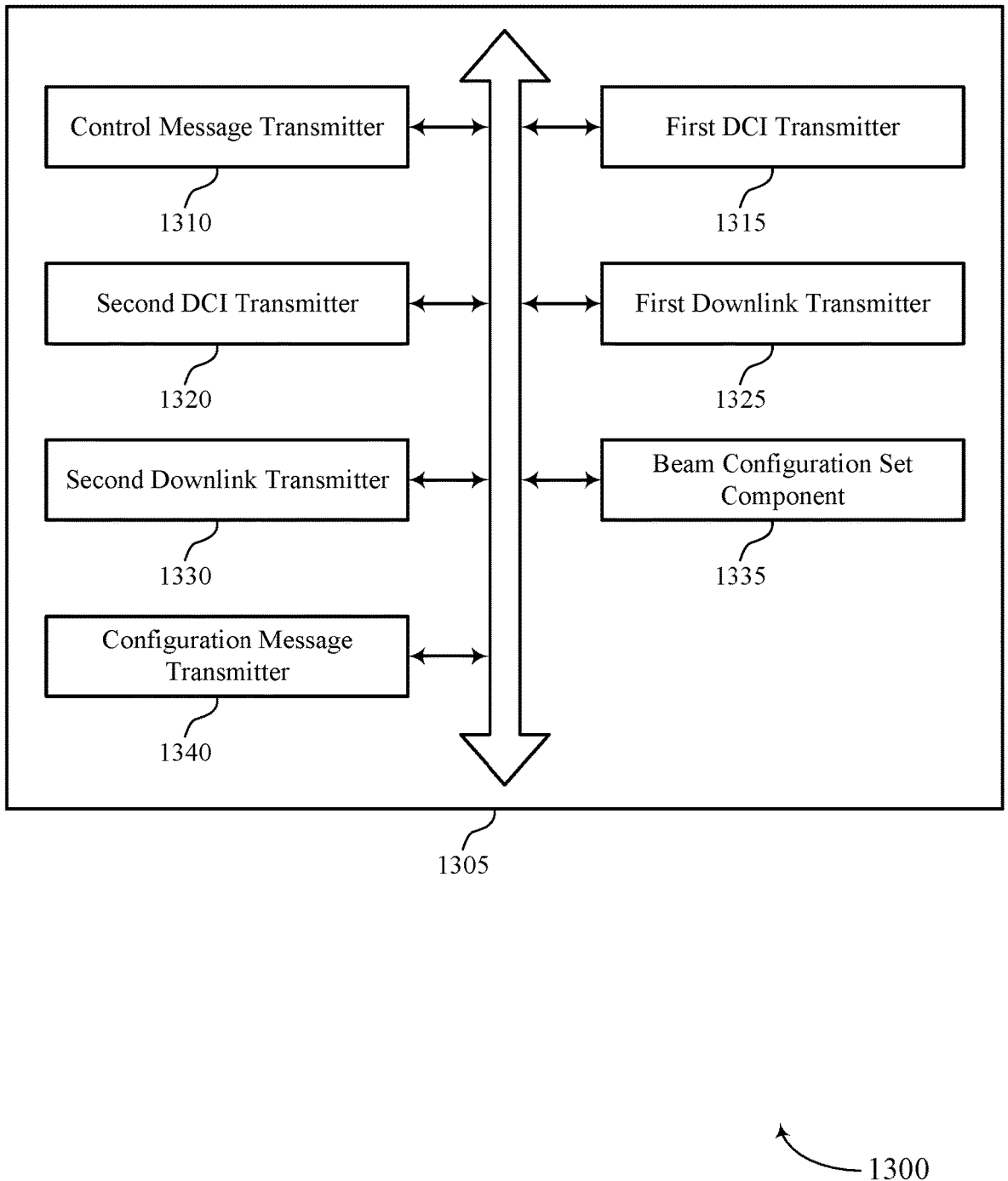
FIG. 13 shows a block diagram of a communications manager supports TCI state activation for multiple transmission reception points in accordance with aspects of the present disclosure.

FIG. 13 shows a block diagram 1300 of a communications manager 1305 that supports TCI state activation for multiple transmission reception points in accordance with aspects of the present disclosure. The communications manager 1305 may be an example of aspects of a communications manager 1115, a communications manager 1215, or a communications manager 1410 described herein. The communications manager 1305 may include a control message transmitter 1310, a first DCI transmitter 1315, a second DCI transmitter 1320, a first downlink transmitter 1325, a second downlink transmitter 1330, a beam configuration set component 1335, and a configuration message transmitter 1340. Each of these modules may communicate, directly or indirectly, with one another (e.g., via one or more buses).

The control message transmitter 1310 may transmit at least one control message indicating a first set of beam configurations associated with a first downlink shared channel from a first TRP and a second set of beam configurations associated with a second downlink shared channel from a second TRP. In some examples, the control message transmitter 1310 may transmit a first control message including a first indication of the first set of beam configurations. In some cases, the control message transmitter 1310 may transmit a second control message including a second indication of the second set of beam configurations. In some instances, transmitting the first control message further includes transmitting the first control message by the first TRP. In some examples, transmitting the second control message further includes transmitting the second control message by the second TRP.

In some examples, the control message transmitter 1310 may transmit one control message including a first indication of the first set of beam configurations and a second indication of the second set of beam configurations. In some cases, the control message transmitter 1310 may transmit the one control message by the first TRP. In some instances, the control message transmitter 1310 may transmit the one control message by the second TRP. In some examples, the at least one control message includes an indicator bit corresponding to each of the set of beam configurations. In some cases, the at least one control message indicates the first set of beam configurations and the second set of beam configurations based on a value of each of the indicator bits corresponding to each of the set of beam configurations. In some instances, each of the one control message includes a first set of identifiers identifying each beam configuration within the first set of beam configurations and a second set of identifiers identifying each beam configuration within the second set of beam configurations. In some cases, the first set of beam configurations includes a set of TCI states. In some cases, the at least one control message includes a MAC-CE.

The first DCI transmitter 1315 may transmit, by the first TRP, a first DCI scheduling a first downlink transmission on the first downlink shared channel, the first DCI indicating a first beam configuration of the first set of beam configurations.

The second DCI transmitter 1320 may transmit, by the second TRP, a second DCI scheduling a second downlink transmission on the second downlink shared channel, the second DCI indicating a second beam configuration of the second set of beam configurations.

The first downlink transmitter 1325 may transmit the first scheduled downlink transmission by the first downlink shared channel according to the first beam configuration.

The second downlink transmitter 1330 may transmit the second scheduled downlink transmission by the second downlink shared channel according to the second beam configuration.

The beam configuration set component 1335 may indicate the first beam configuration from the first set of beam configurations based on a mapping between one or more bits within the first DCI and the first set of beam configurations indicated by the first control message. In some examples, the beam configuration set component 1335 may indicate the second beam configuration from the second set of beam configurations based on a mapping between one or more bits within the second DCI and the second set of beam configurations indicated by the second control message. In some cases, the beam configuration set component 1335 may indicate that the first set of beam configurations are associated with the first downlink shared channel from the first TRP based on transmitting the first control message by the first TRP. In some instances, the beam configuration set component 1335 may indicate that the second set of beam configurations are associated with the second downlink shared channel from the second TRP based on transmitting the second control message by the second TRP. In some examples, the beam configuration set component 1335 may indicate that the first set of beam configurations are associated with the first downlink shared channel from the first TRP based on a first value of an indicator bit within the first control message indicating the first TRP.

In some examples, the beam configuration set component 1335 may indicate that the second set of beam configurations are associated with the second downlink shared channel from the second TRP based on a second value of the indicator bit within the second control message indicating the second TRP. In some cases, the beam configuration set component 1335 may indicate the first beam configuration from the first set of beam configurations based on a mapping between one or more bits within the first DCI and the first set of beam configurations indicated by the one control message. In some instances, the beam configuration set component 1335 may indicate the second beam configuration from the second set of beam configurations based on a mapping between one or more bits within the second DCI and the second set of beam configurations indicated by the one control message. In some examples, the beam configuration set component 1335 may indicate that the first set of identifiers identify each beam configuration within the first set of beam configurations based on a position of the first set of identifiers within the one control message and transmitting the one control message by the first TRP.

In some examples, the beam configuration set component 1335 may indicate that the second set of identifiers identify each beam configuration within the second set of beam configurations based on a position of the second set of identifiers within the one control message and transmitting the one control message by the first TRP. In some cases, the beam configuration set component 1335 may indicate that the first set of identifiers identify each beam configuration within the first set of beam configurations based on at least one of a position of the first set of identifiers within the one control message or one or more indicator bits within the one control message indicating the first TRP or the second TRP. In some instances, the beam configuration set component 1335 may indicate that the second set of identifiers identify each beam configuration within the second set of beam configurations based on at least one of a position of the second set of identifiers within the one control message or the one or more indicator bits within the one control message indicating the first TRP or the second TRP. In some cases, the one or more indicator bits include one indicator bit. In some examples, the one or more indicator bits include more than one indicator bit. In some cases, each indicator bit corresponds to at least one identifier of the first set of identifiers or the second set of identifiers.

The configuration message transmitter 1340 may transmit a configuration message indicating a set of beam configurations associated with the first downlink shared channel and the second downlink shared channel, where the at least one control message indicates the first set of beam configurations and the second set of beam configurations from the set of beam configurations. In some cases, the configuration message is an RRC message.

Figure 14:
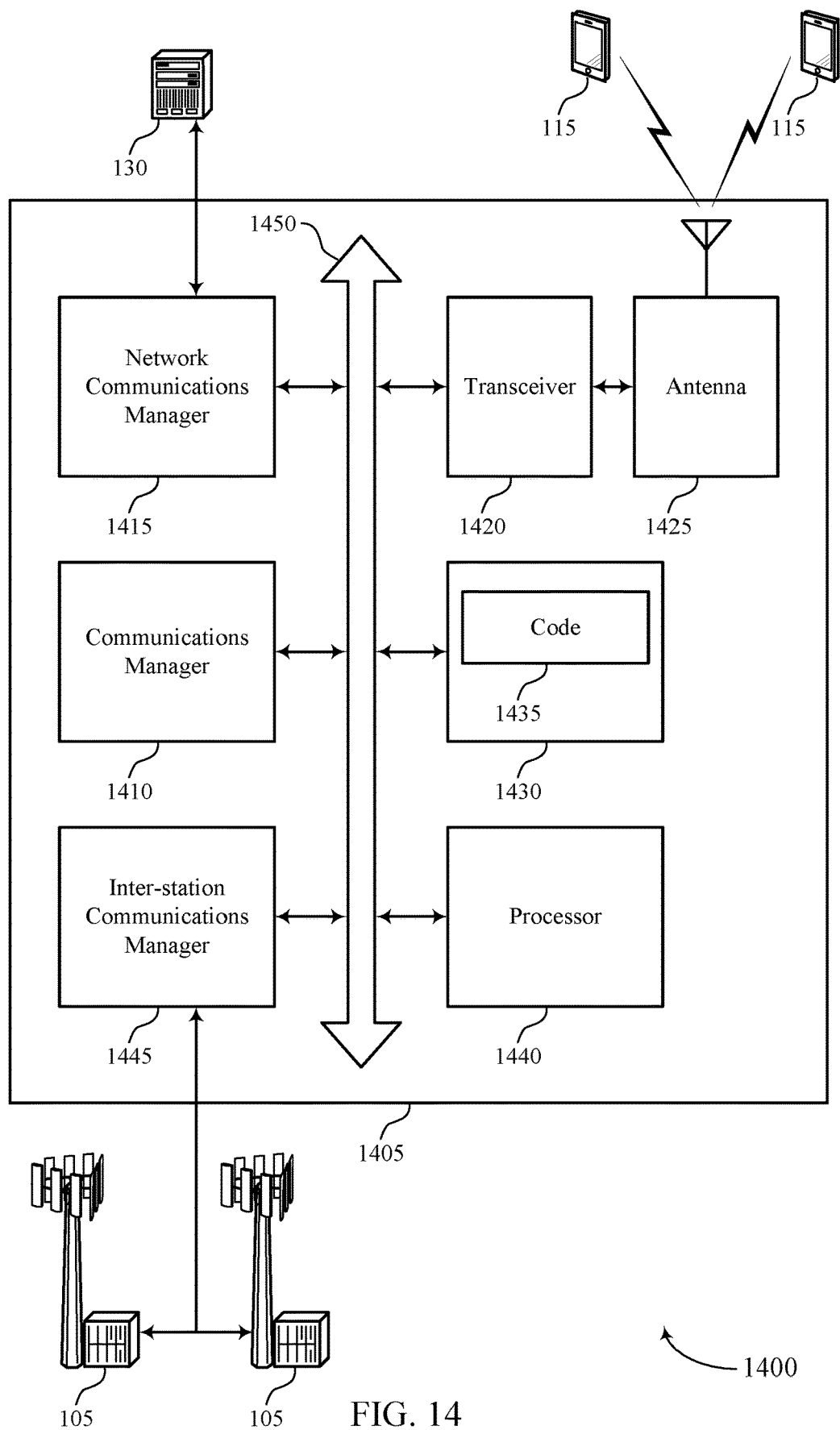
FIG. 14 shows a diagram of a system including a device that supports TCI state activation for multiple transmission reception points in accordance with aspects of the present disclosure.

FIG. 14 shows a diagram of a system 1400 including a device 1405 that supports TCI state activation for multiple transmission reception points in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit at least one control message indicating a first set of beam configurations associated with a first downlink shared channel from a first TRP and a second set of beam configurations associated with a second downlink shared channel from a second TRP, transmit, by the first TRP, a first DCI scheduling a first downlink transmission on the first downlink shared channel, the first DCI indicating a first beam configuration of the first set of beam configurations, transmit, by the second TRP, a second DCI scheduling a second downlink transmission on the second downlink shared channel, the second DCI indicating a second beam configuration of the second set of beam configurations, transmit the first scheduled downlink transmission by the first downlink shared channel according to the first beam configuration, and transmit the second scheduled downlink transmission by the second downlink shared channel according to the second beam configuration.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting TCI state activation for multiple transmission reception points).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
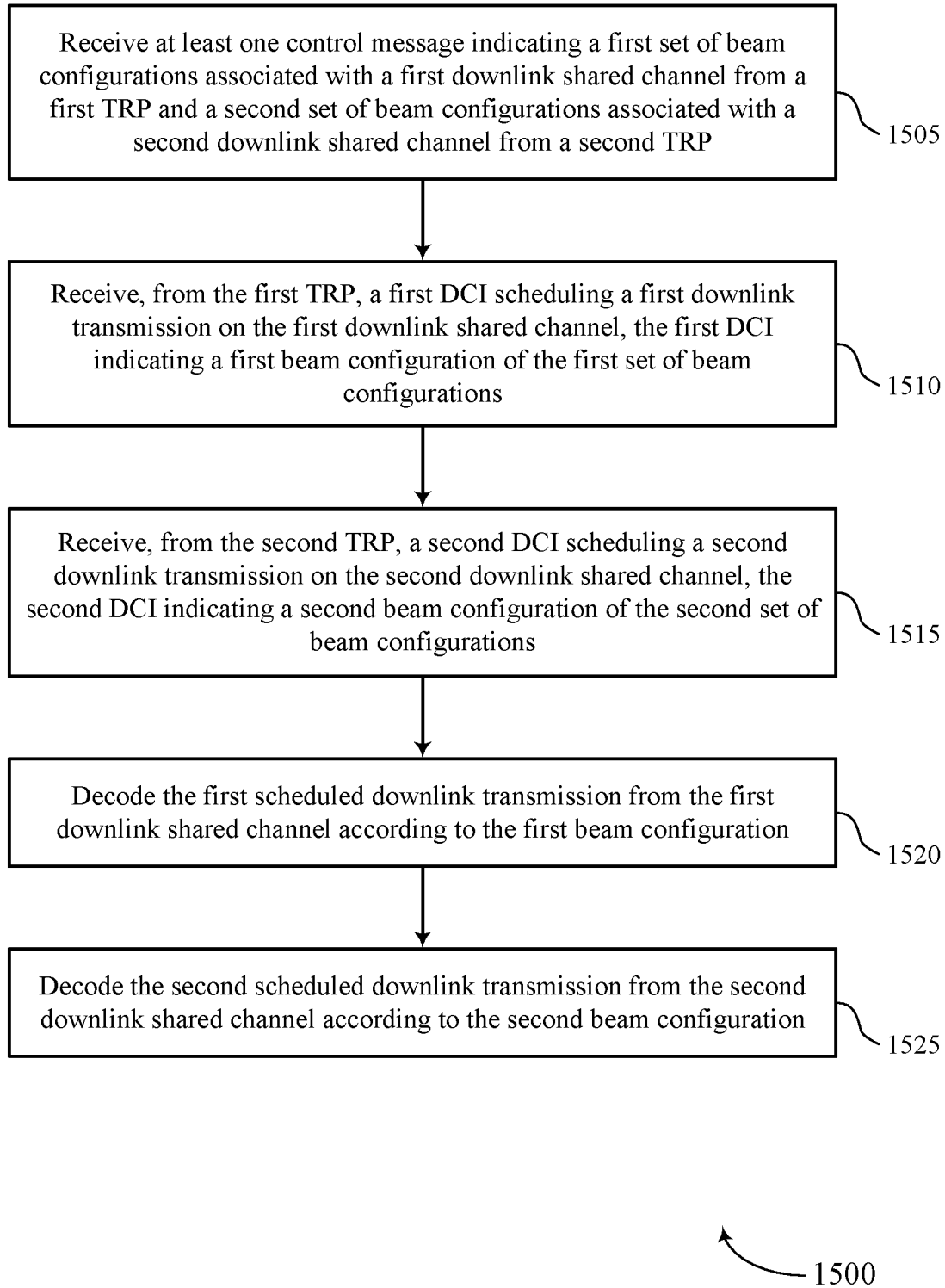
FIGS. 15 through 20 show flowcharts illustrating methods that support TCI state activation for multiple transmission reception points in accordance with aspects of the present disclosure.

FIG. 15 shows a flowchart illustrating a method 1500 that supports TCI state activation for multiple transmission reception points in accordance with aspects of the present disclosure. The operations of method 1500 may be implemented by a UE 115 or its components as described herein. For example, the operations of method 1500 may be performed by a UE Coding Manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive at least one control message indicating a first set of beam configurations associated with a first downlink shared channel from a first TRP and a second set of beam configurations associated with a second downlink shared channel from a second TRP. The operations of 1505 may be performed according to the methods described herein. In some examples, aspects of the operations of 1505 may be performed by a control message manager as described with reference to FIGS. 7 through 10.

At 1510, the UE may receive, from the first TRP, a first DCI scheduling a first downlink transmission on the first downlink shared channel, the first DCI indicating a first beam configuration of the first set of beam configurations. The operations of 1510 may be performed according to the methods described herein. In some examples, aspects of the operations of 1510 may be performed by a first DCI manager as described with reference to FIGS. 7 through 10.

At 1515, the UE may receive, from the second TRP, a second DCI scheduling a second downlink transmission on the second downlink shared channel, the second DCI indicating a second beam configuration of the second set of beam configurations. The operations of 1515 may be performed according to the methods described herein. In some examples, aspects of the operations of 1515 may be performed by a second DCI manager as described with reference to FIGS. 7 through 10.

At 1520, the UE may decode the first scheduled downlink transmission from the first downlink shared channel according to the first beam configuration. The operations of 1520 may be performed according to the methods described herein. In some examples, aspects of the operations of 1520 may be performed by a first decoding manager as described with reference to FIGS. 7 through 10.

At 1525, the UE may decode the second scheduled downlink transmission from the second downlink shared channel according to the second beam configuration. The operations of 1525 may be performed according to the methods described herein. In some examples, aspects of the operations of 1525 may be performed by a second decoding manager as described with reference to FIGS. 7 through 10.

Figure 16:
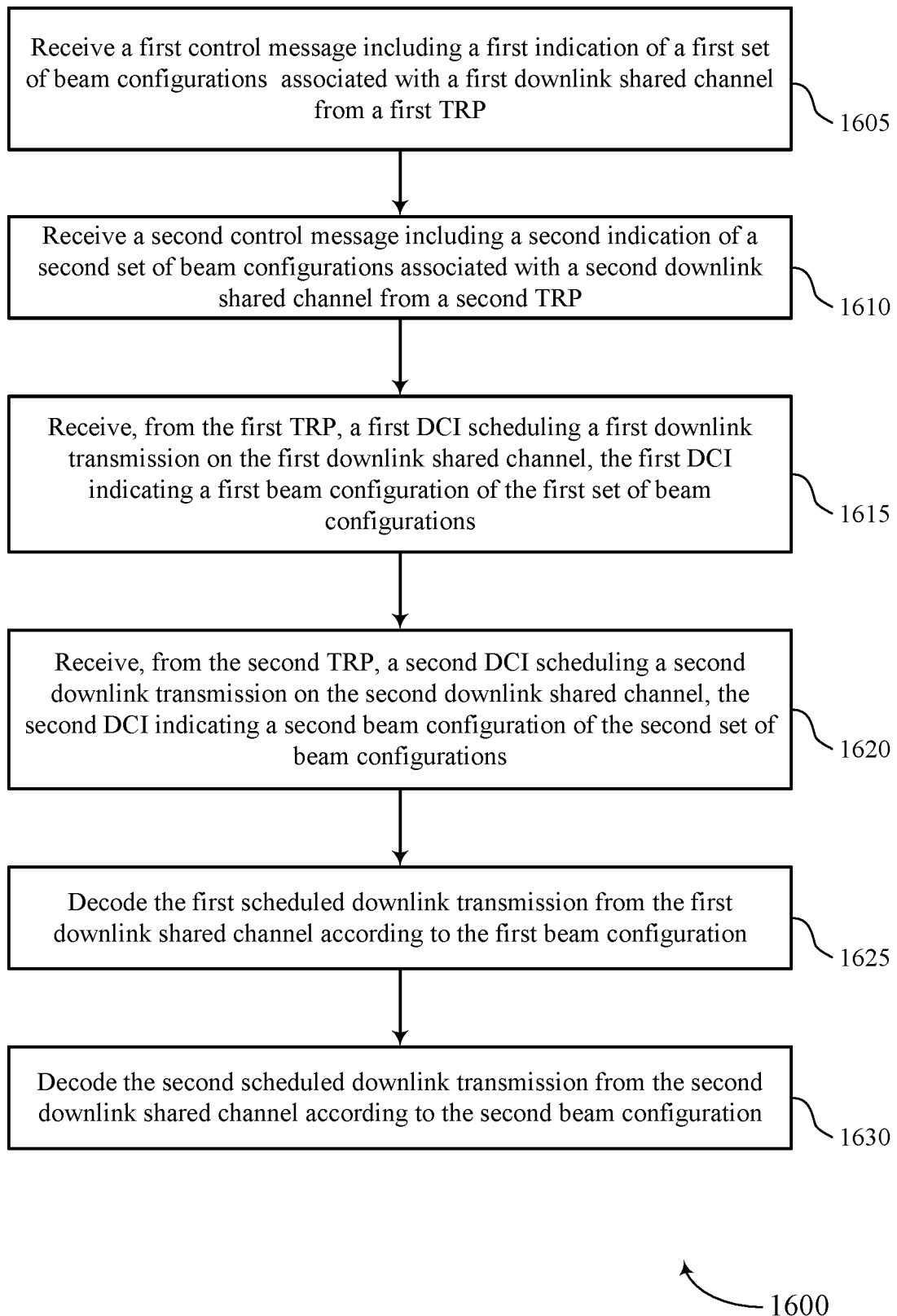

FIG. 16 shows a flowchart illustrating a method 1600 that supports TCI state activation for multiple transmission reception points in accordance with aspects of the present disclosure. The operations of method 1600 may be implemented by a UE 115 or its components as described herein. For example, the operations of method 1600 may be performed by a UE Coding Manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive a first control message including a first indication indicating a first set of beam configurations associated with a first downlink shared channel from a first TRP. The operations of 1605 may be performed according to the methods described herein. In some examples, aspects of the operations of 1605 may be performed by a control message manager as described with reference to FIGS. 7 through 10.

At 1610, the UE may receive a second control message including a second indication of the second set of beam configurations associated with a second downlink shared channel from a second TRP. The operations of 1610 may be performed according to the methods described herein. In some examples, aspects of the operations of 1610 may be performed by a control message manager as described with reference to FIGS. 7 through 10.

At 1615, the UE may receive, from the first TRP, a first DCI scheduling a first downlink transmission on the first downlink shared channel, the first DCI indicating a first beam configuration of the first set of beam configurations. The operations of 1615 may be performed according to the methods described herein. In some examples, aspects of the operations of 1615 may be performed by a first DCI manager as described with reference to FIGS. 7 through 10.

At 1620, the UE may receive, from the second TRP, a second DCI scheduling a second downlink transmission on the second downlink shared channel, the second DCI indicating a second beam configuration of the second set of beam configurations. The operations of 1620 may be performed according to the methods described herein. In some examples, aspects of the operations of 1620 may be performed by a second DCI manager as described with reference to FIGS. 7 through 10.

At 1625, the UE may decode the first scheduled downlink transmission from the first downlink shared channel according to the first beam configuration. The operations of 1625 may be performed according to the methods described herein. In some examples, aspects of the operations of 1625 may be performed by a first decoding manager as described with reference to FIGS. 7 through 10.

At 1630, the UE may decode the second scheduled downlink transmission from the second downlink shared channel according to the second beam configuration. The operations of 1630 may be performed according to the methods described herein. In some examples, aspects of the operations of 1630 may be performed by a second decoding manager as described with reference to FIGS. 7 through 10.

Figure 17:
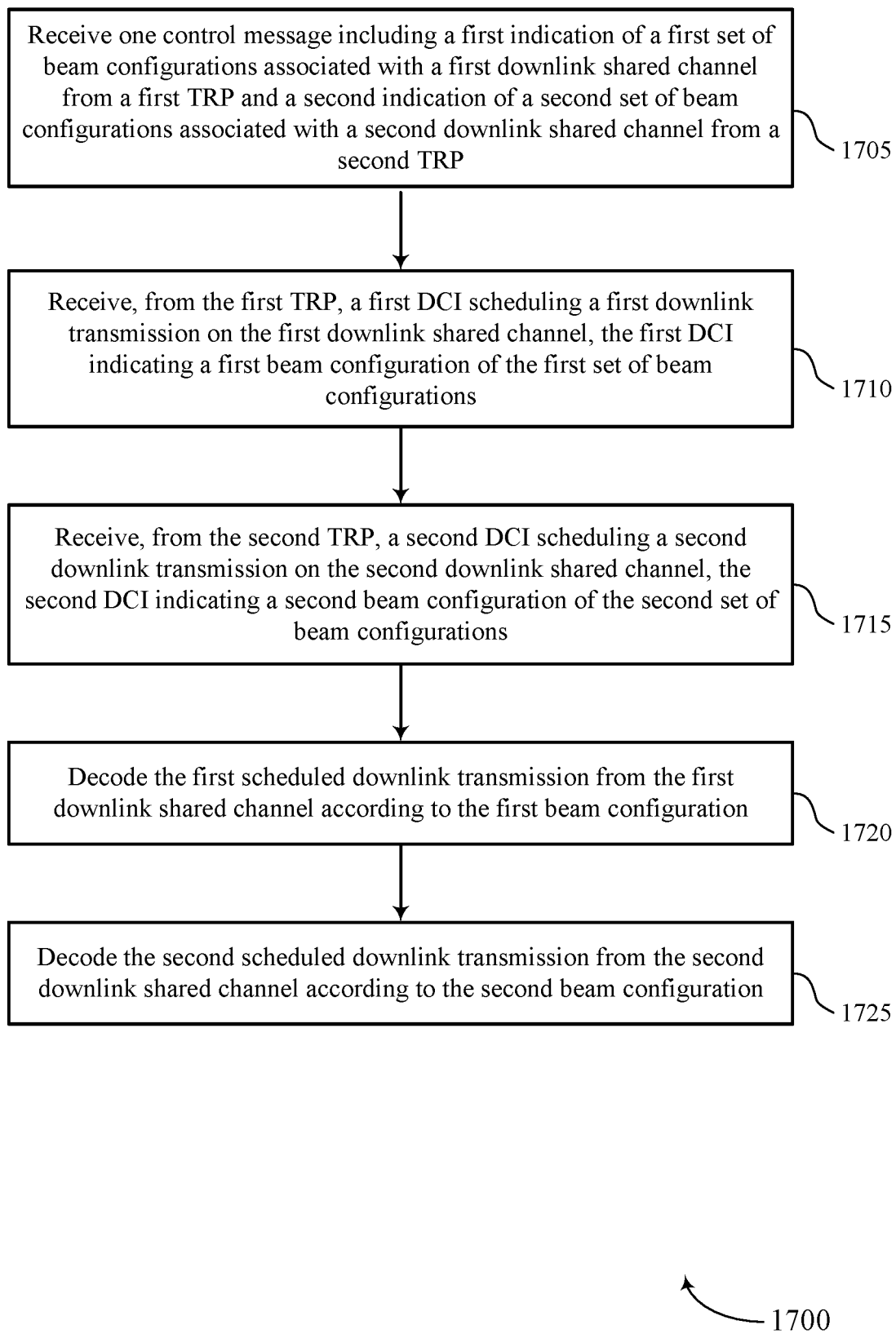

FIG. 17 shows a flowchart illustrating a method 1700 that supports TCI state activation for multiple transmission reception points in accordance with aspects of the present disclosure. The operations of method 1700 may be implemented by a UE 115 or its components as described herein. For example, the operations of method 1700 may be performed by a UE Coding Manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive one control message including a first indication of a first set of beam configurations associated with a first downlink shared channel from a first TRP and a second indication of a second set of beam configurations associated with a second downlink shared channel from a second TRP. The operations of 1705 may be performed according to the methods described herein. In some examples, aspects of the operations of 1705 may be performed by a control message manager as described with reference to FIGS. 7 through 10.

At 1710, the UE may receive, from the first TRP, a first DCI scheduling a first downlink transmission on the first downlink shared channel, the first DCI indicating a first beam configuration of the first set of beam configurations. The operations of 1710 may be performed according to the methods described herein. In some examples, aspects of the operations of 1710 may be performed by a first DCI manager as described with reference to FIGS. 7 through 10.

At 1715, the UE may receive, from the second TRP, a second DCI scheduling a second downlink transmission on the second downlink shared channel, the second DCI indicating a second beam configuration of the second set of beam configurations. The operations of 1715 may be performed according to the methods described herein. In some examples, aspects of the operations of 1715 may be performed by a second DCI manager as described with reference to FIGS. 7 through 10.

At 1720, the UE may decode the first scheduled downlink transmission from the first downlink shared channel according to the first beam configuration. The operations of 1720 may be performed according to the methods described herein. In some examples, aspects of the operations of 1720 may be performed by a first decoding manager as described with reference to FIGS. 7 through 10.

At 1725, the UE may decode the second scheduled downlink transmission from the second downlink shared channel according to the second beam configuration. The operations of 1725 may be performed according to the methods described herein. In some examples, aspects of the operations of 1725 may be performed by a second decoding manager as described with reference to FIGS. 7 through 10.

Figure 18:
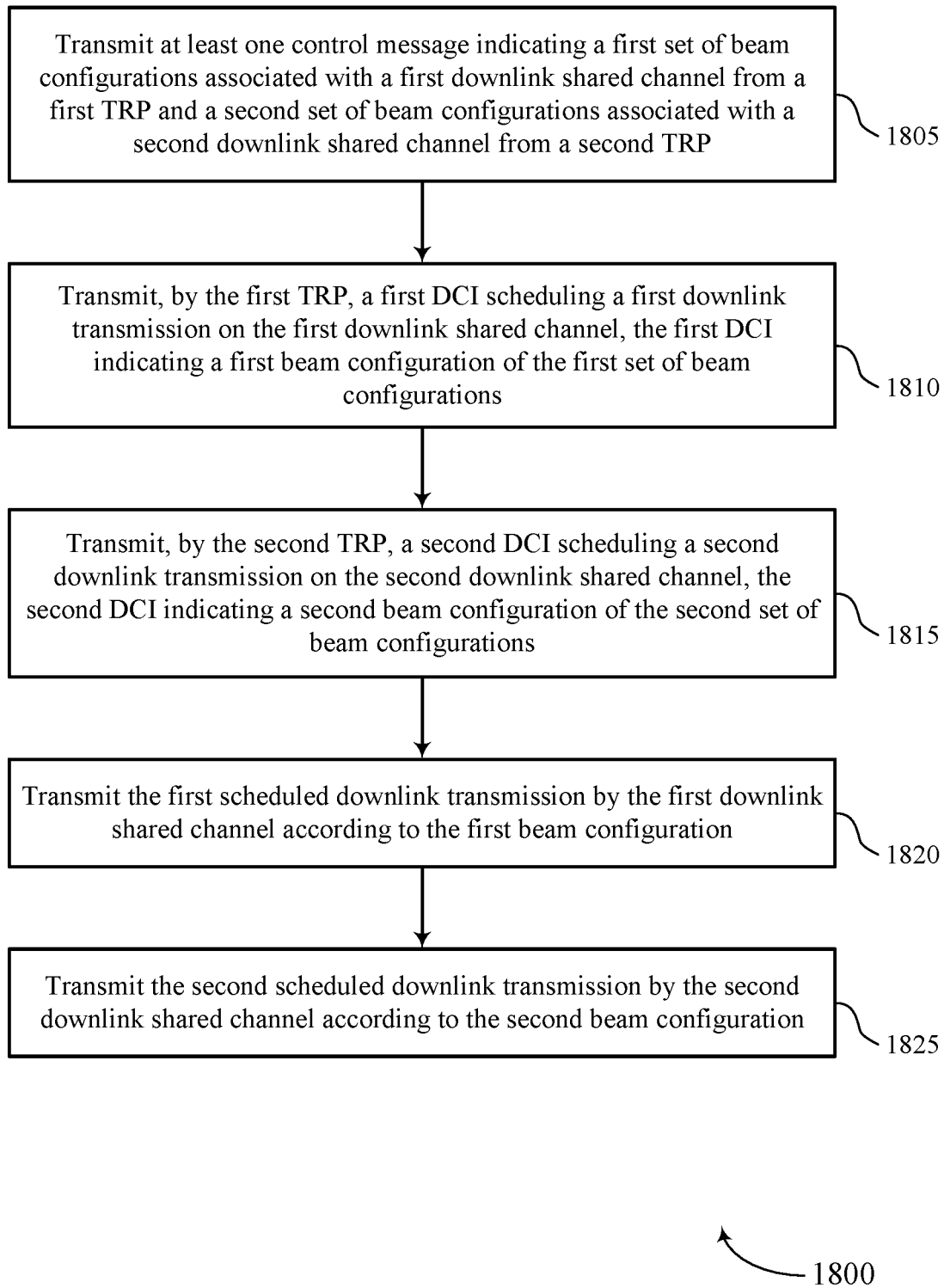

FIG. 18 shows a flowchart illustrating a method 1800 that supports TCI state activation for multiple transmission reception points in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may transmit at least one control message indicating a first set of beam configurations associated with a first downlink shared channel from a first TRP and a second set of beam configurations associated with a second downlink shared channel from a second TRP. The operations of 1805 may be performed according to the methods described herein. In some examples, aspects of the operations of 1805 may be performed by a control message transmitter as described with reference to FIGS. 11 through 14.

At 1810, the base station may transmit, by the first TRP, a first DCI scheduling a first downlink transmission on the first downlink shared channel, the first DCI indicating a first beam configuration of the first set of beam configurations. The operations of 1810 may be performed according to the methods described herein. In some examples, aspects of the operations of 1810 may be performed by a first DCI transmitter as described with reference to FIGS. 11 through 14.

At 1815, the base station may transmit, by the second TRP, a second DCI scheduling a second downlink transmission on the second downlink shared channel, the second DCI indicating a second beam configuration of the second set of beam configurations. The operations of 1815 may be performed according to the methods described herein. In some examples, aspects of the operations of 1815 may be performed by a second DCI transmitter as described with reference to FIGS. 11 through 14.

At 1820, the base station may transmit the first scheduled downlink transmission by the first downlink shared channel according to the first beam configuration. The operations of 1820 may be performed according to the methods described herein. In some examples, aspects of the operations of 1820 may be performed by a first downlink transmitter as described with reference to FIGS. 11 through 14.

At 1825, the base station may transmit the second scheduled downlink transmission by the second downlink shared channel according to the second beam configuration. The operations of 1825 may be performed according to the methods described herein. In some examples, aspects of the operations of 1825 may be performed by a second downlink transmitter as described with reference to FIGS. 11 through 14.

Figure 19:
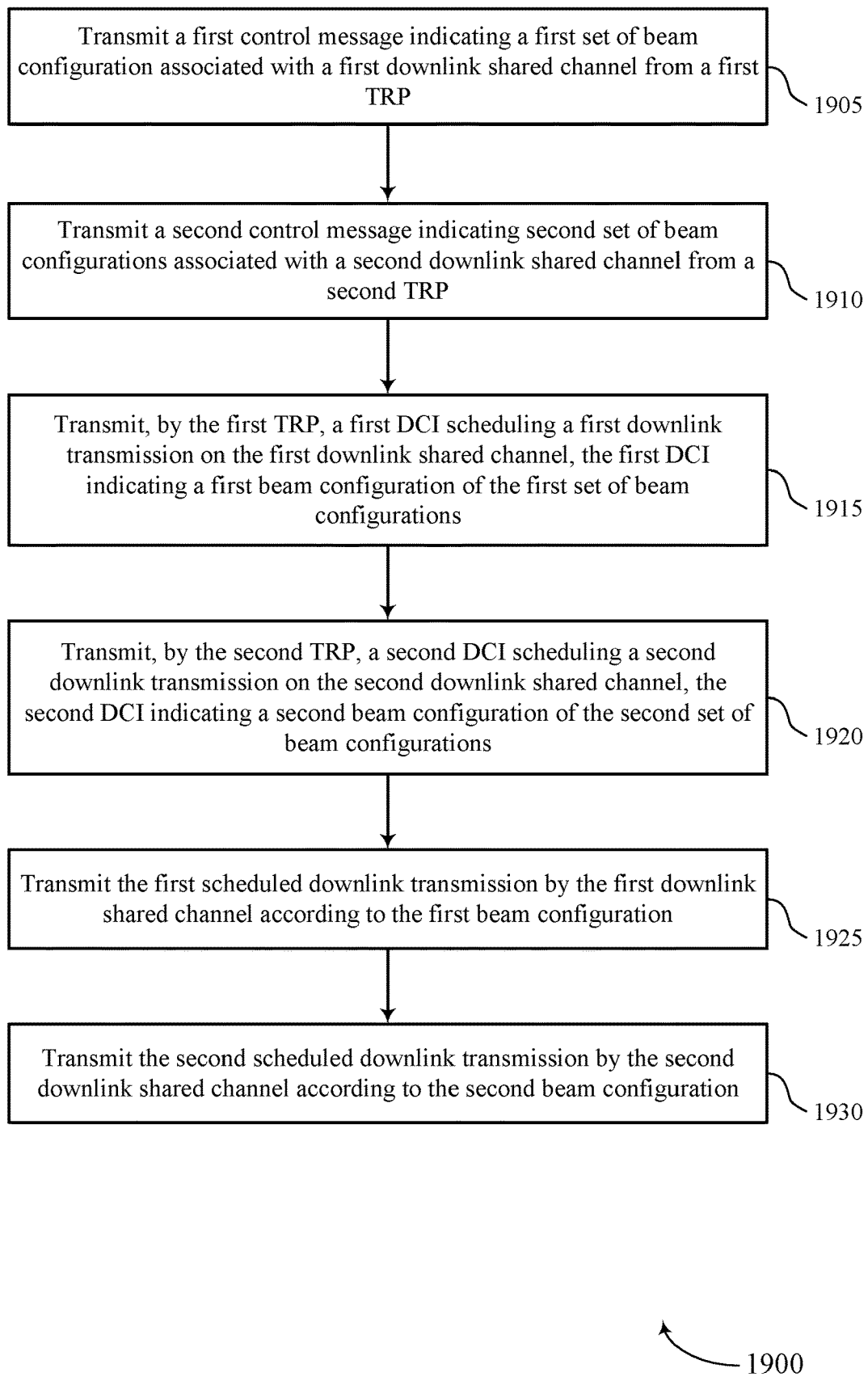

FIG. 19 shows a flowchart illustrating a method 1900 that supports TCI state activation for multiple transmission reception points in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may transmit a first control message including an indication indicating a first set of beam configurations associated with a first downlink shared channel from a first TRP. The operations of 1905 may be performed according to the methods described herein. In some examples, aspects of the operations of 1905 may be performed by a control message transmitter as described with reference to FIGS. 11 through 14.

At 1910, the base station may transmit a second control message including an indication of a second set of beam configurations associated with a second downlink shared channel from a second TRP first indication. The operations of 1910 may be performed according to the methods described herein. In some examples, aspects of the operations of 1910 may be performed by a control message transmitter as described with reference to FIGS. 11 through 14.

At 1915, the base station may transmit, by the first TRP, a first DCI scheduling a first downlink transmission on the first downlink shared channel, the first DCI indicating a first beam configuration of the first set of beam configurations. The operations of 1915 may be performed according to the methods described herein. In some examples, aspects of the operations of 1915 may be performed by a first DCI transmitter as described with reference to FIGS. 11 through 14.

At 1920, the base station may transmit, by the second TRP, a second DCI scheduling a second downlink transmission on the second downlink shared channel, the second DCI indicating a second beam configuration of the second set of beam configurations. The operations of 1920 may be performed according to the methods described herein. In some examples, aspects of the operations of 1920 may be performed by a second DCI transmitter as described with reference to FIGS. 11 through 14.

At 1925, the base station may transmit the first scheduled downlink transmission by the first downlink shared channel according to the first beam configuration. The operations of 1925 may be performed according to the methods described herein. In some examples, aspects of the operations of 1925 may be performed by a first downlink transmitter as described with reference to FIGS. 11 through 14.

At 1930, the base station may transmit the second scheduled downlink transmission by the second downlink shared channel according to the second beam configuration. The operations of 1930 may be performed according to the methods described herein. In some examples, aspects of the operations of 1930 may be performed by a second downlink transmitter as described with reference to FIGS. 11 through 14.

Figure 20:
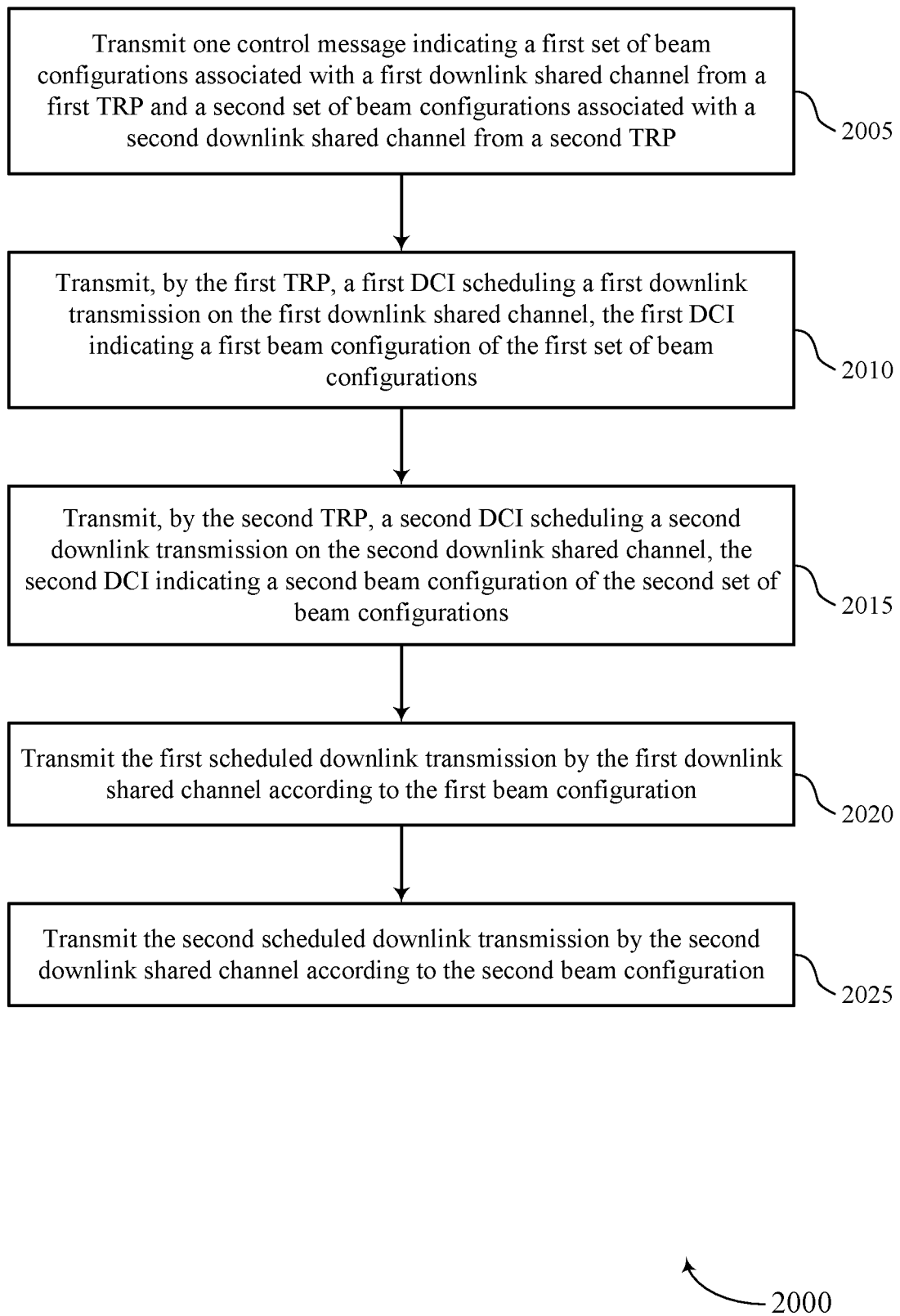

FIG. 20 shows a flowchart illustrating a method 2000 that supports TCI state activation for multiple transmission reception points in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may transmit one control message indicating a first set of beam configurations associated with a first downlink shared channel from a first TRP and a second set of beam configurations associated with a second downlink shared channel from a second TRP. The operations of 2005 may be performed according to the methods described herein. In some examples, aspects of the operations of 2005 may be performed by a control message transmitter as described with reference to FIGS. 11 through 14.

At 2010, the base station may transmit, by the first TRP, a first DCI scheduling a first downlink transmission on the first downlink shared channel, the first DCI indicating a first beam configuration of the first set of beam configurations. The operations of 2010 may be performed according to the methods described herein. In some examples, aspects of the operations of 2010 may be performed by a first DCI transmitter as described with reference to FIGS. 11 through 14.

At 2015, the base station may transmit, by the second TRP, a second DCI scheduling a second downlink transmission on the second downlink shared channel, the second DCI indicating a second beam configuration of the second set of beam configurations. The operations of 2015 may be performed according to the methods described herein. In some examples, aspects of the operations of 2015 may be performed by a second DCI transmitter as described with reference to FIGS. 11 through 14.

At 2020, the base station may transmit the first scheduled downlink transmission by the first downlink shared channel according to the first beam configuration. The operations of 2020 may be performed according to the methods described herein. In some examples, aspects of the operations of 2020 may be performed by a first downlink transmitter as described with reference to FIGS. 11 through 14.

At 2025, the base station may transmit the second scheduled downlink transmission by the second downlink shared channel according to the second beam configuration. The operations of 2025 may be performed according to the methods described herein. In some examples, aspects of the operations of 2025 may be performed by a second downlink transmitter as described with reference to FIGS. 11 through 14.

The following provides an overview of aspects of the present disclosure:

Aspect 1: A method for wireless communication, comprising: receiving at least one control message indicating a first set of beam configurations associated with a first downlink shared channel from a first TRP and a second set of beam configurations associated with a second downlink shared channel from a second TRP; receiving, from the first TRP, a first DCI scheduling a first downlink transmission on the first downlink shared channel, the first DCI indicating a first beam configuration of the first set of beam configurations; receiving, from the second TRP, a second DCI scheduling a second downlink transmission on the second downlink shared channel, the second DCI indicating a second beam configuration of the second set of beam configurations; decoding the first scheduled downlink transmission from the first downlink shared channel according to the first beam configuration; and decoding the second scheduled downlink transmission from the second downlink shared channel according to the second beam configuration.

Aspect 2: The method of aspect 1, wherein receiving the at least one control message further comprises: receiving a first control message comprising a first indication of the first set of beam configurations; and receiving a second control message comprising a second indication of the second set of beam configurations.

Aspect 3: The method of aspect 2, further comprising: identifying the first beam configuration from the first set of beam configurations based at least in part on a mapping between one or more bits within the first DCI and the first set of beam configurations indicated by the first control message; and identifying the second beam configuration from the second set of beam configurations based at least in part on a mapping between one or more bits within the second DCI and the second set of beam configurations indicated by the second control message.

Aspect 4: The method of any of aspects 2 through 3, wherein receiving the first control message further comprises receiving the first control message from the first TRP; and receiving the second control message further comprises receiving the second control message from the second TRP.

Aspect 5: The method of aspect 4, further comprising: determining that the first set of beam configurations are associated with the first downlink shared channel from the first TRP based at least in part on a first value of an indicator bit within the first control message indicating the first TRP; and determining that the second set of beam configurations are associated with the second downlink shared channel from the second TRP based at least in part on a second value of the indicator the second control message indicating the second TRP.

Aspect 6: The method of any of aspects 2 through 5, further comprising: determining that the first set of beam configurations are associated with the first downlink shared channel from the first TRP based at least in part on a first value of an indicator bit within the first control message indicating the first TRP; and determining that the second set of beam configurations are associated with the second downlink shared channel from the second TRP based at least in part on a second value of the indicator bit within the second control message indicating the second TRP.

Aspect 7: The method of any of aspects 1 through 6, further comprising: receiving a configuration message indicating a plurality of beam configurations associated with the first downlink shared channel and the second downlink shared channel, wherein the at least one control message indicates the first set of beam configurations and the second set of beam configurations from the plurality of beam configurations.

Aspect 8: The method of aspect 7, wherein the at least one control message comprises an indicator bit corresponding to each of the plurality of beam configurations; and the at least one control message indicates the first set of beam configurations and the second set of beam configurations based at least in part on a value of each of the indicator bits corresponding to each of the plurality of beam configurations.

Aspect 9: The method of any of aspects 7 through 8, wherein the configuration message is a radio resource control message.

Aspect 10: The method of any of aspects 1 through 9, wherein receiving the at least one control message further comprises: receiving one control message comprising a first indication of the first set of beam configurations and a second indication of the second set of beam configurations.

Aspect 11: The method of aspect 10, wherein receiving the one control message further comprises: receiving the one control message from the first TRP.

Aspect 12: The method of any of aspects 10 through 11, wherein receiving the one control message further comprises: receiving the one control message from the second TRP.

Aspect 13: The method of any of aspects 10 through 12, wherein each of the one control message comprises a first set of identifiers identifying each beam configuration within the first set of beam configurations and a second set of identifiers identifying each beam configuration within the second set of beam configurations.

Aspect 14: The method of aspect 13, further comprising: identifying the first beam configuration from the first set of beam configurations based at least in part on a mapping between one or more bits within the first DCI and the first set of beam configurations indicated by the one control message; and identifying the second beam configuration from the second set of beam configurations based at least in part on a mapping between one or more bits within the second DCI and the second set of beam configurations indicated by the one control message.

Aspect 15: The method of any of aspects 13 through 14, further comprising: determining that the first set of identifiers identify each beam configuration within the first set of beam configurations based at least in part on a position of the first set of identifiers within the one control message and receiving the one control message from the first TRP; and determining that the second set of identifiers identify each beam configuration within the second set of beam configurations based at least in part on a position of the second set of identifiers within the one control message and receiving the one control message from the first TRP.

Aspect 16: The method of any of aspects 13 through 15, further comprising: determining that the first set of identifiers identify each beam configuration within the first set of beam configurations based at least in part on at least one of a position of the first set of identifiers within the one control message or one or more indicator bits within the one control message indicating the first TRP or the second TRP; and determining that the second set of identifiers identify each beam configuration within the second set of beam configurations based at least in part on at least one of a position of the second set of identifiers within the one control message or the one or more indicator bits within the one control message indicating the first TRP or the second TRP.

Aspect 17: The method of aspect 16, wherein the one or more indicator bits comprise one indicator bit.

Aspect 18: The method of any of aspects 16 through 17, wherein the one or more indicator bits comprise two or more indicator bits; and each indicator bit corresponds to at least one identifier of the first set of identifiers or the second set of identifiers.

Aspect 19: The method of any of aspects 1 through 18, wherein the first set of beam configurations comprises a set of TCI states.

Aspect 20: The method of any of aspects 1 through 19, wherein the at least one control message comprises a MAC-CE.

Aspect 21: A method for wireless communication, comprising: transmitting at least one control message indicating a first set of beam configurations associated with a first downlink shared channel from a first TRP and a second set of beam configurations associated with a second downlink shared channel from a second TRP; transmitting, by the first TRP, a first DCI scheduling a first downlink transmission on the first downlink shared channel, the first DCI indicating a first beam configuration of the first set of beam configurations; transmitting, by the second TRP, a second DCI scheduling a second downlink transmission on the second downlink shared channel, the second DCI indicating a second beam configuration of the second set of beam configurations; transmitting the first scheduled downlink transmission by the first downlink shared channel according to the first beam configuration; and transmitting the second scheduled downlink transmission by the second downlink shared channel according to the second beam configuration.

Aspect 22: The method of aspect 21, wherein transmitting the at least one control message further comprises: transmitting a first control message comprising a first indication of the first set of beam configurations; and transmitting a second control message comprising a second indication of the second set of beam configurations.

Aspect 23: The method of aspect 22, further comprising: indicating the first beam configuration from the first set of beam configurations based at least in part on a mapping between one or more bits within the first DCI and the first set of beam configurations indicated by the first control message; and indicating the second beam configuration from the second set of beam configurations based at least in part on a mapping between one or more bits within the second DCI and the second set of beam configurations indicated by the second control message.

Aspect 24: The method of any of aspects 22 through 23, wherein transmitting the first control message further comprises transmitting the first control message by the first TRP; and transmitting the second control message further comprises transmitting the second control message by the second TRP.

Aspect 25: The method of aspect 24, further comprising: indicating that the first set of beam configurations are associated with the first downlink shared channel from the first TRP based at least in part on transmitting the first control message by the first TRP; and indicating that the second set of beam configurations are associated with the second downlink shared channel from the second TRP based at least in part on transmitting the second control message by the second TRP.

Aspect 26: The method of any of aspects 22 through 25, further comprising: indicating that the first set of beam configurations are associated with the first downlink shared channel from the first TRP based at least in part on a first value of an indicator bit within the first control message indicating the first TRP; and indicating that the second set of beam configurations are associated with the second downlink shared channel from the second TRP based at least in part on a second value of the indicator bit within the second control message indicating the second TRP.

Aspect 27: The method of any of aspects 21 through 26, further comprising: transmitting a configuration message indicating a plurality of beam configurations associated with the first downlink shared channel and the second downlink shared channel, wherein the at least one control message indicates the first set of beam configurations and the second set of beam configurations from the plurality of beam configurations.

Aspect 28: The method of aspect 27, wherein the at least one control message comprises an indicator bit corresponding to each of the plurality of beam configurations; and the at least one control message indicates the first set of beam configurations and the second set of beam configurations based at least in part on a value of each of the indicator bits corresponding to each of the plurality of beam configurations.

Aspect 29: The method of any of aspects 27 through 28, wherein the configuration message is a radio resource control message.

Aspect 30: The method of any of aspects 21 through 29, wherein transmitting the at least one control message further comprises: transmitting one control message comprising a first indication of the first set of beam configurations and a second indication of the second set of beam configurations.

Aspect 31: The method of aspect 30, wherein transmitting the one control message further comprises: transmitting the one control message by the first TRP.

Aspect 32: The method of any of aspects 30 through 31, wherein transmitting the one control message further comprises: transmitting the one control message by the second TRP.

Aspect 33: The method of any of aspects 30 through 32, wherein each of the one control message comprises a first set of identifiers identifying each beam configuration within the first set of beam configurations and a second set of identifiers identifying each beam configuration within the second set of beam configurations.

Aspect 34: The method of aspect 33, further comprising: indicating the first beam configuration from the first set of beam configurations based at least in part on a mapping between one or more bits within the first DCI and the first set of beam configurations indicated by the one control message; and indicating the second beam configuration from the second set of beam configurations based at least in part on a mapping between one or more bits within the second DCI and the second set of beam configurations indicated by the one control message.

Aspect 35: The method of any of aspects 33 through 34, further comprising: indicating that the first set of identifiers identify each beam configuration within the first set of beam configurations based at least in part on a position of the first set of identifiers within the one control message and transmitting the one control message by the first TRP; and indicating that the second set of identifiers identify each beam configuration within the second set of beam configurations based at least in part on a position of the second set of identifiers within the one control message and transmitting the one control message by the first TRP.

Aspect 36: The method of any of aspects 33 through 35, further comprising: indicating that the first set of identifiers identify each beam configuration within the first set of beam configurations based at least in part on at least one of a position of the first set of identifiers within the one control message or one or more indicator bits within the one control message indicating the first TRP or the second TRP; and indicating that the second set of identifiers identify each beam configuration within the second set of beam configurations based at least in part on at least one of a position of the second set of identifiers within the one control message or the one or more indicator bits within the one control message indicating the first TRP or the second TRP.

Aspect 37: The method of aspect 36, wherein the one or more indicator bits comprise one indicator bit.

Aspect 38: The method of any of aspects 36 through 37, wherein the one or more indicator bits comprise more than one indicator bit; and each indicator bit corresponds to at least one identifier of the first set of identifiers or the second set of identifiers.

Aspect 39: The method of any of aspects 21 through 38, wherein the first set of beam configurations comprises a set of TCI states.

Aspect 40: The method of any of aspects 21 through 39, wherein the at least one control message comprises a MAC-CE.

Aspect 41: An apparatus for wireless communication, comprising a processor; memory coupled with the processor; and instructions stored in the memory and executable by the processor to cause the apparatus to perform a method of any of aspects 1 through 20.

Aspect 42: An apparatus for wireless communication, comprising at least one means for performing a method of any of aspects 1 through 20.

Aspect 43: A non-transitory computer-readable medium storing code for wireless communication, the code comprising instructions executable by a processor to perform a method of any of aspects 1 through 20.

Aspect 44: An apparatus for wireless communication, comprising a processor; memory coupled with the processor; and instructions stored in the memory and executable by the processor to cause the apparatus to perform a method of any of aspects 21 through 40.

Aspect 45: An apparatus for wireless communication, comprising at least one means for performing a method of any of aspects 21 through 40.

Aspect 46: A non-transitory computer-readable medium storing code for wireless communication, the code comprising instructions executable by a processor to perform a method of any of aspects 21 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE), comprising:
a transceiver configured to:
receive at least one control message indicating a first set of beam configurations associated with a first downlink shared channel from a first transmission reception point and a second set of beam configurations associated with a second downlink shared channel from a second transmission reception point;
receive, from the first transmission reception point, a first downlink control information scheduling a first downlink transmission on the first downlink shared channel, the first downlink control information indicating a first beam configuration of the first set of beam configurations; and
receive, from the second transmission reception point, a second downlink control information scheduling a second downlink transmission on the second downlink shared channel, the second downlink control information indicating a second beam configuration of the second set of beam configurations,
at least one processor coupled with the transceiver, and
memory comprising instructions executable by the at least one processor to cause the UE to:
decode the first scheduled downlink transmission from the first downlink shared channel according to the first beam configuration; and
decode the second scheduled downlink transmission from the second downlink shared channel according to the second beam configuration.

2. The UE of claim 1, wherein to receive the at least one control message, the transceiver is further configured to:
receive a first control message comprising a first indication of the first set of beam configurations; and
receive a second control message comprising a second indication of the second set of beam configurations.

3. The UE of claim 2, wherein the instructions are further executable by the at least one processor to cause the UE to:
determine that the first set of beam configurations are associated with the first downlink shared channel from the first transmission reception point based at least in part on a first value of an indicator bit within the first control message indicating the first transmission reception point; and
determine that the second set of beam configurations are associated with the second downlink shared channel from the second transmission reception point based at least in part on a second value of the indicator bit within the second control message indicating the second transmission reception point.

4. The UE of claim 2, wherein the instructions are further executable by the at least one processor to cause the UE to:
identify the first beam configuration from the first set of beam configurations based at least in part on a mapping between one or more bits within the first downlink control information and the first set of beam configurations indicated by the first control message; and
identify the second beam configuration from the second set of beam configurations based at least in part on a mapping between one or more bits within the second downlink control information and the second set of beam configurations indicated by the second control message.

5. The UE of claim 1, wherein the transceiver is further configured to:
receive a configuration message indicating a plurality of beam configurations associated with the first downlink shared channel and the second downlink shared channel, wherein the at least one control message indicates the first set of beam configurations and the second set of beam configurations from the plurality of beam configurations.

6. The UE of claim 5, wherein:
the at least one control message comprises an indicator bit corresponding to each of the plurality of beam configurations; and
the at least one control message indicates the first set of beam configurations and the second set of beam configurations based at least in part on a value of each of the indicator bits corresponding to each of the plurality of beam configurations.

7. The UE of claim 5, wherein the configuration message is a radio resource control message.

8. The UE of claim 1, wherein to receive the at least one control message, the transceiver is further configured to:
receive one control message comprising a first indication of the first set of beam configurations and a second indication of the second set of beam configurations.

9. The UE of claim 8, wherein each of the one control message comprises a first set of identifiers identifying each beam configuration within the first set of beam configurations and a second set of identifiers identifying each beam configuration within the second set of beam configurations.

10. The UE of claim 9, wherein the instructions are further executable by the at least one processor to cause the UE to:
identify the first beam configuration from the first set of beam configurations based at least in part on a mapping between one or more bits within the first downlink control information and the first set of beam configurations indicated by the one control message; and
identify the second beam configuration from the second set of beam configurations based at least in part on a mapping between one or more bits within the second downlink control information and the second set of beam configurations indicated by the one control message.

11. The UE of claim 9, wherein the instructions are further executable by the at least one processor to cause the UE to:
determine that the first set of identifiers identify each beam configuration within the first set of beam configurations based at least in part on a position of the first set of identifiers within the one control message and receiving the one control message from the first transmission reception point; and determine that the second set of identifiers identify each beam configuration within the second set of beam configurations based at least in part on a position of the second set of identifiers within the one control message and receiving the one control message from the first transmission reception point.

12. A method for wireless communication at a user equipment (UE), comprising:

receiving at least one control message indicating a first set of beam configurations associated with a first downlink shared channel from a first transmission reception point and a second set of beam configurations associated with a second downlink shared channel from a second transmission reception point;

receiving, from the first transmission reception point, a first downlink control information scheduling a first downlink transmission on the first downlink shared channel, the first downlink control information indicating a first beam configuration of the first set of beam configurations;

receiving, from the second transmission reception point, a second downlink control information scheduling a second downlink transmission on the second downlink shared channel, the second downlink control information indicating a second beam configuration of the second set of beam configurations;

decoding the first scheduled downlink transmission from the first downlink shared channel according to the first beam configuration; and decoding the second scheduled downlink transmission from the second downlink shared channel according to the second beam configuration.

13. A network entity, comprising:

a transceiver configured to:

transmit at least one control message indicating a first set of beam configurations associated with a first downlink shared channel from a first transmission reception point and a second set of beam configurations associated with a second downlink shared channel from a second transmission reception point;

transmit, by the first transmission reception point, a first downlink control information scheduling a first downlink transmission on the first downlink shared channel, the first downlink control information indicating a first beam configuration of the first set of beam configurations;

transmit, by the second transmission reception point, a second downlink control information scheduling a second downlink transmission on the second downlink shared channel, the second downlink control information indicating a second beam configuration of the second set of beam configurations;

transmit the first scheduled downlink transmission by the first downlink shared channel according to the first beam configuration; and transmit the second scheduled downlink transmission by the second downlink shared channel according to the second beam configuration.

14. The network entity of claim 13, wherein to transmit the at least one control message, the transceiver is further configured to:

transmit a first control message comprising a first indication of the first set of beam configurations; and transmit a second control message comprising a second indication of the second set of beam configurations.

15. The network entity of claim 14, further comprising:

at least one processor coupled with the transceiver, and memory comprising instructions executable by the at least one processor to cause the network entity to:

indicate that the first set of beam configurations are associated with the first downlink shared channel from the first transmission reception point based at least in part on a first value of an indicator bit within the first control message indicating the first transmission reception point; and indicate that the second set of beam configurations are associated with the second downlink shared channel from the second transmission reception point based at least in part on a second value of the indicator bit within the second control message indicating the second transmission reception point.

16. The network entity of claim 14, further comprising:

at least one processor coupled with the transceiver, and memory comprising instructions executable by the at least one processor to cause the network entity to:

indicate that the first set of beam configurations are associated with the first downlink shared channel from the first transmission reception point based at least in part on a first value of an indicator bit within the first control message indicating the first transmission reception point; and indicate that the second set of beam configurations are associated with the second downlink shared channel from the second transmission reception point based at least in part on a second value of the indicator bit within the second control message indicating the second transmission reception point.

17. The network entity of claim 13, wherein the transceiver is further configured to:

transmit a configuration message indicating a plurality of beam configurations associated with the first downlink shared channel and the second downlink shared channel, wherein the at least one control message indicates the first set of beam configurations and the second set of beam configurations from the plurality of beam configurations.

18. The network entity of claim 17, wherein:

the at least one control message comprises an indicator bit corresponding to each of the plurality of beam configurations; and the at least one control message indicates the first set of beam configurations and the second set of beam configurations based at least in part on a value of each of the indicator bits corresponding to each of the plurality of beam configurations.

19. The network entity of claim 13, wherein to transmit the at least one control message, the transceiver is further configured to:

transmit one control message comprising a first indication of the first set of beam configurations and a second indication of the second set of beam configurations.

20. The network entity of claim 19, wherein each of the one control message comprises a first set of identifiers identifying each beam configuration within the first set of beam configurations and a second set of identifiers identifying each beam configuration within the second set of beam configurations.

* * * * *